US010678156B2

(12) United States Patent
Kitao et al.

(10) Patent No.: US 10,678,156 B2
(45) Date of Patent: Jun. 9, 2020

(54) PIGMENT DISPERSION, METHOD FOR MANUFACTURING TONER, AQUEOUS INK, AND TRIAZO COMPOUND

(71) Applicant: CANON KABUSHIKI KAISHA, Tokyo (JP)

(72) Inventors: Akiko Kitao, Kawasaki (JP); Ai Hayakawa, Tokyo (JP); Koichi Suzuki, Yokohama (JP); Ryuji Higashi, Kawasaki (JP); Taiki Watanabe, Akishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/933,150

(22) Filed: Mar. 22, 2018

(65) Prior Publication Data

US 2018/0275545 A1  Sep. 27, 2018

(30) Foreign Application Priority Data

Mar. 27, 2017  (JP) ................... 2017-061994

(51) Int. Cl.
| | |
|---|---|
| *G03G 9/00* | (2006.01) |
| *G03G 9/09* | (2006.01) |
| *C09B 26/06* | (2006.01) |
| *G03G 9/08* | (2006.01) |
| *C09B 56/20* | (2006.01) |
| *C09D 11/037* | (2014.01) |
| *C09B 67/22* | (2006.01) |
| *C09B 67/00* | (2006.01) |
| *C09B 67/46* | (2006.01) |
| *C09D 11/322* | (2014.01) |

(52) U.S. Cl.
CPC ............ *G03G 9/091* (2013.01); *C09B 26/06* (2013.01); *C09B 56/20* (2013.01); *C09B 67/009* (2013.01); *C09B 67/0022* (2013.01); *C09B 67/0033* (2013.01); *C09D 11/037* (2013.01); *C09D 11/322* (2013.01); *G03G 9/0806* (2013.01)

(58) Field of Classification Search
CPC ....... C09B 26/06; C09B 56/20; C09B 67/009; C09B 67/0033; C09D 11/326; C09D 11/322; C09D 11/037; G03G 9/091; G03G 9/0924; G03G 9/09775; G03G 9/0806
USPC .................................. 534/550, 554
See application file for complete search history.

(56) References Cited

U.S. PATENT DOCUMENTS

| | | | | | |
|---|---|---|---|---|---|
| 2,313,233 | A | * | 3/1943 | Fryling | ................. C08F 236/06 526/219.1 |
| 7,377,974 | B2 | * | 5/2008 | Grimm | ................ C09D 11/326 106/31.8 |
| 8,440,382 | B2 | * | 5/2013 | Isono | ................... G03G 9/0806 430/137.1 |
| 8,628,899 | B2 | * | 1/2014 | Kawamura | ........... C09B 31/043 430/108.22 |
| 2007/0240618 | A1 | * | 10/2007 | Rohr | .................... B01J 19/0093 106/496 |

FOREIGN PATENT DOCUMENTS

| | | |
|---|---|---|
| JP | 3-113462 A | 5/1991 |
| JP | 6-148927 A | 5/1994 |
| JP | 10-110129 A | 4/1998 |
| JP | 11-57458 A | 3/1999 |
| JP | 11-189739 A | 7/1999 |
| JP | 11-246807 A | 9/1999 |
| JP | 11-323232 A | 11/1999 |
| JP | 2000-265094 A | 9/2000 |
| JP | 2003-513137 A | 4/2003 |
| JP | 2006-30760 A | 2/2006 |
| JP | 3826615 B2 | 9/2006 |
| JP | 2011-219741 A * | 11/2011 |
| JP | 2012-67285 A | 4/2012 |
| WO | 97/48769 A1 | 12/1997 |

OTHER PUBLICATIONS

American Chemical Society abstract describing Polish Patent No. PL 161837, Accession No. 1995:985957, copyright 2019 ACS on STN (Year: 1995).*
American Chemical Society File Registry No. 158033-96-6, which entered STN on Sep. 30, 1994, copyright 2019 ACS on STN ( Year: 1994).*
Japanese Patent Office J-PlatPat machine-assisted English-language translation of JP 2011-219741 (pub. Nov. 2011) (Year: 2011).*
American Chemical Society (ACS) File Registry No. 67990-05-0, copyright 2019 ACS on STN, which entered STN on Nov. 16, 1984 , (Year: 1984).*
W.W.Hartmann, J.B.Dickey, Organic Syntheses, Coll. vol. 2, p. 163 (1943); vol. 14, p. 24 (1934).

* cited by examiner

*Primary Examiner* — Mark A Chapman
(74) *Attorney, Agent, or Firm* — Canon U.S.A. Inc., IP Division

(57) ABSTRACT

A pigment dispersion has low viscosity and good dispersion property without depending on pigment species. The pigment dispersion contains a dispersion medium, an organic pigment, and a triazo compound having a specific structure.

4 Claims, No Drawings

PIGMENT DISPERSION, METHOD FOR MANUFACTURING TONER, AQUEOUS INK, AND TRIAZO COMPOUND

BACKGROUND OF THE INVENTION

Field of the Invention

The present disclosure relates to a pigment dispersion, a method for manufacturing a toner, an aqueous ink, and a triazo compound.

Description of the Related Art

In recent years, color images have become very popular, and a demand for the enhancement of image quality has increased. In an offset ink, a gravure ink, a paint, an ink jet ink, an ink for color filters, a toner, and the like, a technique for improving the dispersibility of inexpensive organic pigments has been demanded in order to obtain high clearness and tinting strength. As one of techniques for improving the dispersibility, it has been proposed to add a dispersant to a pigment. In particular, in order to improve the dispersibility of a pigment in toner particles, various dispersants have been proposed in a toner of each color, such as yellow, magenta, cyan, and black.

Japanese Patent Laid-Open No. 2012-67285 discloses using a compound having an azo skeleton structure as the dispersant in order to improve the dispersibility of an azo-based pigment in a yellow toner.

Japanese Patent Laid-Open No. 2006-30760 discloses using a specific polyester-based dispersant in order to improve the dispersibility of a magenta pigment in a magenta toner.

Japanese Patent Laid-Open No. 3-113462 discloses using a polymer containing sodium styrenesulfonate as a monomer unit as the dispersant in order to improve the dispersibility of a phthalocyanine pigment in a cyan toner.

Japanese Patent Laid-Open No. 6-148927 discloses using a copolymer containing a styrene-based monomer and an acrylic acid ester-based (or methacrylic acid ester-based) monomer as the dispersant in order to improve the dispersibility of carbon black in a black toner.

A pigment dispersion for use in an ink jet ink and a pigment dispersion for use in a color filter, for example, which are used for purposes other than a toner, have been generally manufactured by a chemical or physical pigment surface modification technique. Japanese Patent No. 3826615 discloses, as a physical surface modification technique, a method utilizing physical adsorption, specifically, a method for obtaining a pigment dispersible in water in which a phthalocyanine derivative having a hydrophilic group or the like is adsorbed to the pigment particle surface and an aqueous ink using the pigment.

SUMMARY OF THE INVENTION

According to a former method, due to the fact that it has been required to add a large amount of a dispersant in order to obtain a certain level of pigment dispersibility and the dispersant is a high molecular weight compound, adverse effects, such as a viscosity increase due to the addition of a large amount of the dispersant, have occurred, so that a good toner has not been able to be created.

Moreover, according to the method described in Japanese Patent No. 3826615, a state of being dispersed in water has been able to be created but, when used for an ink jet ink, for example, the storage stability of a practical use level has not been secured in some cases.

Moreover, in a combination of a pigment and a dispersant according to a former method, a good dispersion has been able to be obtained but, when the combination is different from that of a method described in the literature, sufficient effects have not been able to be demonstrated in some cases.

It is an aspect of the present disclosure to solve the above-described problems. In other words, it is an aspect of the present disclosure to provide a pigment dispersion which has low viscosity and good dispersion property without depending on pigment species.

The present disclosure relates to a pigment dispersion containing a compound having a structure represented by the following formula (1),

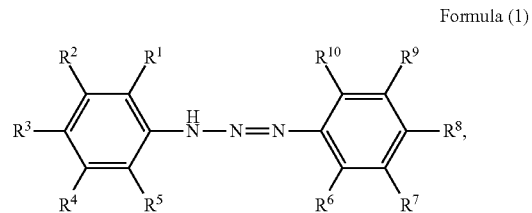

Formula (1)

wherein, in Formula (1), $R^1$ to $R^{10}$ each independently represent a hydrogen atom, an unsubstituted alkyl group, an alkyl group substituted with a carboxy group, an alkyl group substituted with a sulfonic acid group or a sulfonic acid alkali metal salt, an alkyl group substituted with a phosphate group or a phosphoric acid alkali metal salt, an alkyl group substituted with a nitro group, an alkyl group substituted with an aryl group, an alkenyl group, an alkynyl group, an alkoxycarbonyl group, an alkenyloxycarbonyl group, an aryloxycarbonyl group, an unsubstituted aryl group, an aryl group substituted with a carboxy group, an aryl group substituted with a nitro group, an aryl group substituted with a halogen group, an amide group, an acylamino group, a nitro group, a cyano group, an alkoxy group, a halogen group, an amino group, an alkylthio group, an acyl group, a carboxy group, a hydroxyl group, a sulfonic acid group or a sulfonic acid alkali metal salt, a phosphate group or a phosphoric alkali metal salt, and $R^1$ to $R^5$ or $R^6$ to $R^{10}$ may be bonded to each other to form a ring, when forming the ring, $R^1$ to $R^{10}$ subjected to the formation of the ring may represent an atomic group required for the formation of the ring, and the formed ring may have a substituent.

Another aspect of the present disclosure provides a method for manufacturing a toner including a process of dispersing an organic pigment and a compound having a structure represented by Formula (1) above in a polymerizable monomer to prepare a polymerizable monomer composition, a granulation process of adding the polymerizable monomer composition to an aqueous medium to form particles of the polymerizable monomer composition in the aqueous medium, and a polymerization process of polymerizing the polymerizable monomer contained in the particles of the polymerizable monomer composition.

Another aspect of the present disclosure provides an aqueous ink containing an aqueous medium, an organic pigment, and a compound having a structure represented by Formula (1) above.

Another aspect of the present disclosure provides a triazo compound having a structure represented by the following formula (2),

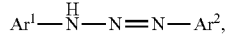

wherein, in Formula (2), $Ar^1$ to $Ar^2$ represent aromatic rings represented by the following formula (3)-1 to the following formula (3)-6 and "*" represents a binding site with a triazo skeleton,

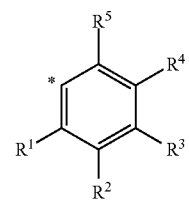

Formula (3)-1

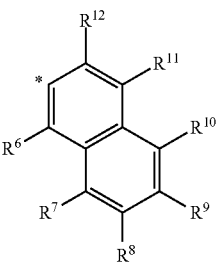

Formula (3)-2

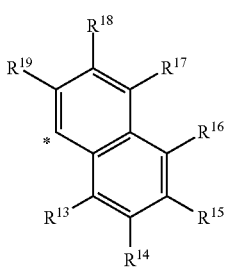

Formula (3)-3

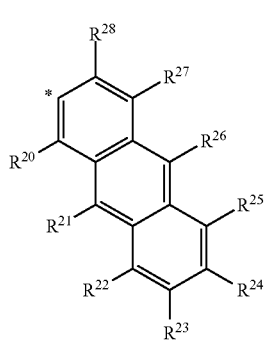

Formula (3)-4

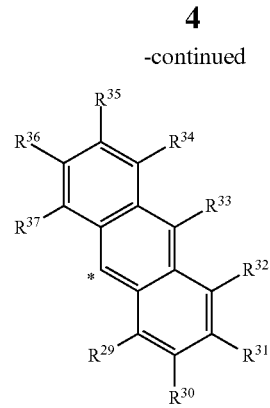

Formula (3)-5

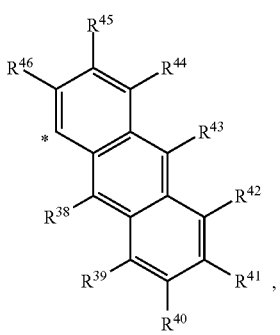

Formula (3)-6 wherein, in Formula (3)-1 to Formula (3)-6, $R^1$ to $R^{46}$ each independently represent a hydrogen atom, an alkyl group having 3 or more and 20 or less carbon atoms, and a substituent represented by the following formula (4)-1 to the following formula (4)-6,

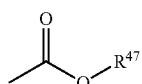

Formula (4)-1

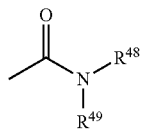

Formula (4)-2

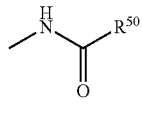

Formula (4)-3

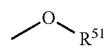

Formula (4)-4

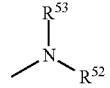

Formula (4)-5

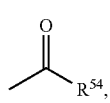

Formula (4)-6 wherein, in Formula (4)-1 to Formula (4)-6, $R^{47}$ represents an alkyl group having 3 or more and 20 or less carbon atoms or an aryl group, $R^{48}$, $R^{49}$, $R^{52}$, and $R^{53}$ each independently represent a hydrogen atom, an alkyl group having 2 or more and 20 or less carbon atoms, or an aryl group, $R^{51}$ and $R^{54}$ each independently represent an alkyl group having 2 or more and 20 or less carbon atoms or an aryl group, and $R^{50}$ represents an alkyl group having 1 or more and 20 or less carbon atoms or an aryl group.

Further features will become apparent from the following description of exemplary embodiments.

DESCRIPTION OF THE EMBODIMENTS

Hereinafter, the present disclosure is described in more detail with reference to example embodiments.

First, a pigment dispersion containing a dispersion medium, an organic pigment, and a compound having a structure represented by Formula (1) is described,

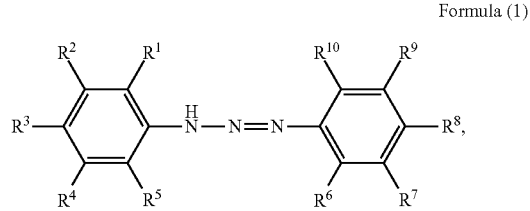

Formula (1)

wherein, in Formula (1), $R^1$ to $R^{10}$ each independently represent a hydrogen atom, an unsubstituted alkyl group, an alkyl group substituted with a carboxy group, an alkyl group substituted with a sulfonic acid group or a sulfonic acid alkali metal salt, an alkyl group substituted with a phosphate group or a phosphoric acid alkali metal salt, an alkyl group substituted with a nitro group, an alkyl group substituted with an aryl group, an alkenyl group, an alkynyl group, an alkoxycarbonyl group, an alkenyloxycarbonyl group, an aryloxycarbonyl group, an unsubstituted aryl group, an aryl group substituted with a carboxy group, an aryl group substituted with a nitro group, an aryl group substituted with a halogen group, an amide group, an acylamino group, a nitro group, a cyano group, an alkoxy group, a halogen group, an amino group, an alkylthio group, an acyl group, a carboxy group, a hydroxyl group, a sulfonic acid group or a sulfonic acid alkali metal salt, or a phosphate group or a phosphoric acid alkali metal salt, or $R^1$ to $R^5$ or $R^6$ to $R^{10}$ may be bonded to form a ring, $R^1$ to $R^{10}$ subjected to the formation of the ring may represent an atomic group required for the formation of the ring, and the formed ring may have a substituent.

In Formula (1), examples of the alkyl group in $R^1$ to $R^{10}$ include, but are not particularly limited to, the following substances, for example. Mentioned are straight-chain, branched, or cyclic primary to tertiary alkyl groups having 1 to 20 carbon atoms, such as a methyl group, an ethyl group, an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group, and a 2-ethylhexyl group. The alkyl group may have a substituent and examples of the substituent include a carboxy group, a phosphate group or a phosphoric acid alkali metal salt, a sulfonic acid group or a sulfonic acid alkali metal salt, a nitro group, an aryl group, and the like.

In Formula (1), as the alkenyl groups in $R^1$ to $R^{10}$, alkenyl groups having 2 or more and 5 or less carbon numbers, such as an ethenyl group and a propenyl group, can be mentioned, for example, although not particularly limited thereto.

In Formula (1), as the alkynyl groups in $R^1$ to $R^{10}$, alkynyl groups having 2 or more and 5 or less carbon atoms, such as an ethynyl group and a propynyl group, can be mentioned, for example, although not particularly limited thereto.

In Formula (1), examples of the alkoxycarbonyl groups in $R^1$ to $R^{10}$ include, but are not particularly limited to, a methoxycarbonyl group, an ethoxycarbonyl group, an iso-propyloxycarbonyl group, a propoxycarbonyl group, a cyclohexyloxycarbonyl group, and the like, for example.

In Formula (1), examples of the alkenyloxycarbonyl groups in $R^1$ to $R^{10}$ include, but are not particularly limited to, vinyloxycarbonyl, an allyloxycarbonyl group, and the like, for example.

In Formula (1), examples of the aryloxycarbonyl groups in $R^1$ to $R^{10}$ include, but are not particularly limited to, a phenyloxycarbonyl group and the like, for example.

In Formula (1), examples of the aryl groups in $R^1$ to $R^{10}$ include, but are not particularly limited to, a phenyl group, a biphenyl group, a naphthyl group, and the like, for example. The aryl group may have a substituent and examples of the substituent include an alkyl group, a halogen group, a carboxy group, a nitro group, and the like.

In Formula (1), examples of the amide groups in $R^1$ to $R^{10}$ include, but are not particularly limited to, the following substances, for example.

Mentioned are groups represented by CONR'R" and carboxylic acid dialkyl amide groups in which R' and R" are alkyl groups, such as a methyl group, an ethyl group, a propyl group, and a butyl group;

carboxylic acid monoalkyl amide groups in which either R' or R" is an alkyl group, such as a methyl group, an ethyl group, a propyl group, and a butyl group, and the other is a hydrogen atom;

acetamide groups in which R' and R" are hydrogen atoms, and the like.

In Formula (1), examples of the aminoacyl groups in $R^1$ to $R^{10}$ include, but are not particularly limited to, groups represented by —NHCOR and groups in which R is an alkyl group, such as a methyl group, an ethyl group, a propyl group, or a butyl group.

In Formula (1), examples of the alkoxy groups in $R^1$ to $R^{10}$, but are not particularly limited to, a methoxy group, an ethoxy group, a propoxy group, a butoxy group, a phenoxy group, and the like, for example.

In Formula (1), examples of the halogen groups in $R^1$ to $R^{10}$ include, but are not particularly limited to, a chlor group, a fluoro group, a bromo group, an iodine group, and the like, for example.

In Formula (1), examples of the amino groups in $R^1$ to $R^{10}$ include, but are not particularly limited to, unsubstituted amino groups, mono-substituted amino groups, such as an N-butyl amino group and an N-benzylamino group, di-substituted amino groups, such as an N,N-diethylamino group, and the like, for example.

In Formula (1), examples of the alkylthio groups in $R^1$ to $R^{10}$ include, but are not particularly limited to, the following substances, for example. Mentioned are an ethylthio group, an n-propylthio group, an iso-propylthio group, an n-butylthio group, a sec-butylthio group, a tert-butylthio group, an octylthio group, a dodecylthio group, a cyclohexylthio group, and the like.

In Formula (1), examples of the acyl groups in $R^1$ to $R^{10}$ include, but are not particularly limited to, a formyl group, an acetyl group, a propionyl group, a benzoyl group, an acryl group, and the like, for example.

In Formula (1), examples of the ring formed by bonding of any of $R^1$ to $R^5$ or $R^6$ to $R^{10}$ include, but are not particularly limited to, monocyclic aromatic hydrocarbons, such as benzene, polycyclic aromatic hydrocarbon, such as naphthalene and anthracene, heterocycles, such as athiophene and pyridine, and the like, for example. Examples of the substituent which the formed ring may have include a carboxy group, a phosphate group, a sulfonic acid group, a hydroxy group, a nitro group, or a group having the following structure, for example,

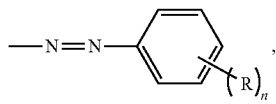

wherein, in the formula, R represents a carboxy group, a phosphate group, or a sulfonic acid group and n represents 0 to 2.

Next, a compound represented by Formula (2) is described,

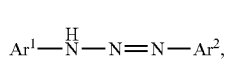

Formula (2)

wherein, in Formula (2), $Ar^1$ and $Ar^2$ each independently represent an aromatic ring represented by Formula (3)-1 to Formula (3)-6,

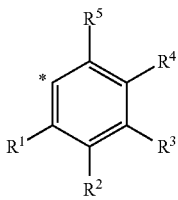

Formula (3)-1

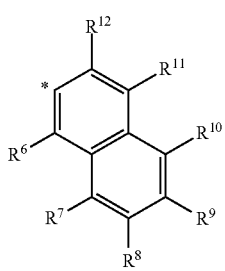

Formula (3)-2

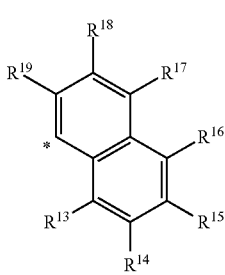

Formula (3)-3

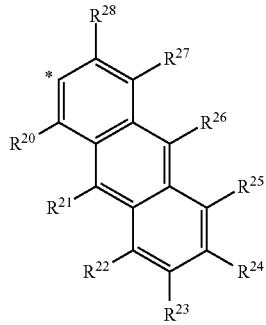

Formula (3)-4

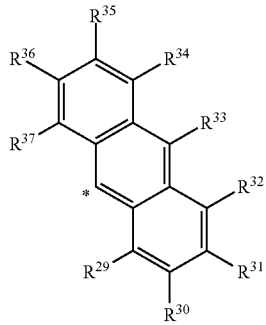

Formula (3)-5

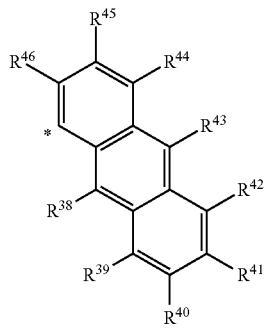

Formula (3)-6 wherein, in Formula (3)-1 to Formula (3)-6, "*" represents a binding site with a triazo skeleton, $R^1$ to $R^{46}$ each independently represent a hydrogen atom, an alkyl group having 3 or more and 20 or less carbon atoms, or a group represented by Formula (4)-1 to Formula (4)-6, or $R^1$ to $R^{46}$ which are bonded to each other to form a ring and are subjected to the formation of the ring represent an atomic group required for the formation of the ring,

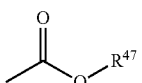

Formula (4)-1

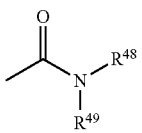

Formula (4)-2

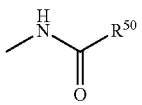

Formula (4)-3

-continued

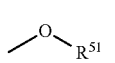
Formula (4)-4

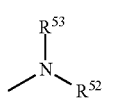
Formula (4)-5

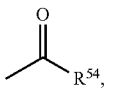
Formula (4)-6 wherein $R^{47}$ to $R^{54}$ in Formula (4)-1 to Formula (4)-6 are described later.

In Formula (3), as the alkyl groups in $R^1$ to $R^{46}$, straight-chain, branched, or cyclic substances may be used and primary to tertiary alkyl groups may all be acceptable, although not particularly limited thereto. For example, the following substances are mentioned. Mentioned are an n-propyl group, an iso-propyl group, an n-butyl group, a sec-butyl group, a tert-butyl group, an octyl group, a dodecyl group, a nonadecyl group, a cyclobutyl group, a cyclopentyl group, a cyclohexyl group, a methylcyclohexyl group, a 2-ethylpropyl group, a 2-ethylhexyl group, and the like.

In Formula (3), examples of the ring formed by bonding of any of $R^1$ to $R^5$, $R^6$ to $R^{12}$, $R^{13}$ to $R^{19}$, $R^{20}$ to $R^{28}$, $R^{29}$ to $R^{37}$, $R^{38}$ to $R^{46}$ include, but are not particularly limited to, the following substances, for example. Mentioned are monocyclic aromatic hydrocarbons, such as benzene, polycyclic aromatic hydrocarbons, such as naphthalene and anthracene, heterocycles, such as thiophene and pyridine, and the like.

In Formula (4)-1, $R^{47}$ is an alkyl group having 3 or more and 20 or less carbon atoms or an aryl group. Examples of the alkyl group in $R^{47}$ include an isopropyl group, an n-propyl group, a cyclohexyl group, and the like and examples of the aryl group include a phenyl group and the like, for example.

In Formula (4)-2, $R^{48}$ and $R^{49}$ each independently represent an alkyl group having 2 or more and 20 or less carbon atoms or an aryl group. Examples of the alkyl groups in $R^{48}$ and $R^{49}$ include an ethyl group, a propyl group, a butyl group, and the like and examples of the aryl group include a phenyl group and the like, for example. The amide group represented by Formula (4)-2 may be a di-substituted amide group in which both $R^{48}$ and $R^{49}$ are substituted or a mono-substituted amide group in which only one of $R^{48}$ and $R^{49}$ is substituted.

In Formula (4)-3, $R^{50}$ is an alkyl group having 1 or more and 20 or less carbon atoms or an aryl group. Examples of the alkyl group in $R^{50}$ include a methyl group, an ethyl group, a propyl group, a butyl group, and the like and examples of the aryl group include a phenyl group and the like, for example.

In Formula (4)-4, $R^{51}$ is an alkyl group having 2 or more and 20 or less carbon atoms or an aryl group. Examples of the alkyl group in $R^{51}$ include an ethyl group, a propyl group, a butyl group, and the like and examples of the aryl group include a phenyl group and the like, for example.

In Formula (4)-5, $R^{52}$ and $R^{53}$ each independently represent an alkyl group having 2 or more and 20 or less carbon atoms or an aryl group. Examples of the alkyl group in $R^{52}$ and $R^{53}$ include an ethyl group, a butyl group, and the like and examples of the aryl group include a phenyl group and the like, for example. The group represented by Formula (4)-5 may be a di-substituted amino group in which both $R^{52}$ and $R^{53}$ are substituted or a mono-substituted amino group in which only one of $R^{52}$ and $R^{53}$ is substituted.

In Formula (4)-6, $R^{54}$ is an alkyl group having 2 or more and 20 or less carbon atoms or an aryl group. Examples of the alkyl group in $R^{54}$ include an ethyl group, a propyl group, and the like and examples of the aryl group include a phenyl group and the like, for example.

The triazo compound having the structure represented by the structure represented by Formula (1) or the structure represented by Formula (2) can be synthesized referring to known methods described in W. W. Hartman, J. B. Dickey Org. Synth. Coll. Vol. 2, 163 and the like, for example.

One aspect of a method for manufacturing the triazo compound having the structure represented by Formula (1) or the structure represented by Formula (2) but the manufacturing method is not always limited thereto,

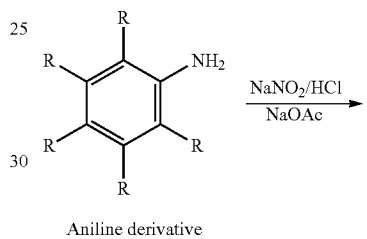

Aniline derivative

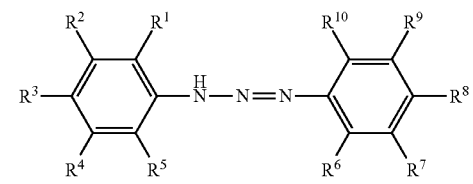

Aniline derivative

An aniline derivative having substituents at the positions represented by R is added dropwise in a solvent and hydrochloric acid is added dropwise in an ice bath, and thereafter sodium nitrite is added dropwise to form a diazonium salt. Separately, an aniline derivative having substituents at the positions represented by R is stirred with a solvent and sodium acetate in an ice bath, and then a diazonium salt is added dropwise to the mixture to give a yellow-white solid. The obtained solid is cleaned with a solvent, followed by filtration under reduced pressure, so that a triazo compound having the structure represented by Formula (1) or the structure represented Formula (2) is obtained.

As suitable specific examples of the triazo compound having the structure represented by Formula (1) or the structure represented Formula (2), compounds (1) to (56) are shown below but the triazo compound is not limited to the following examples,

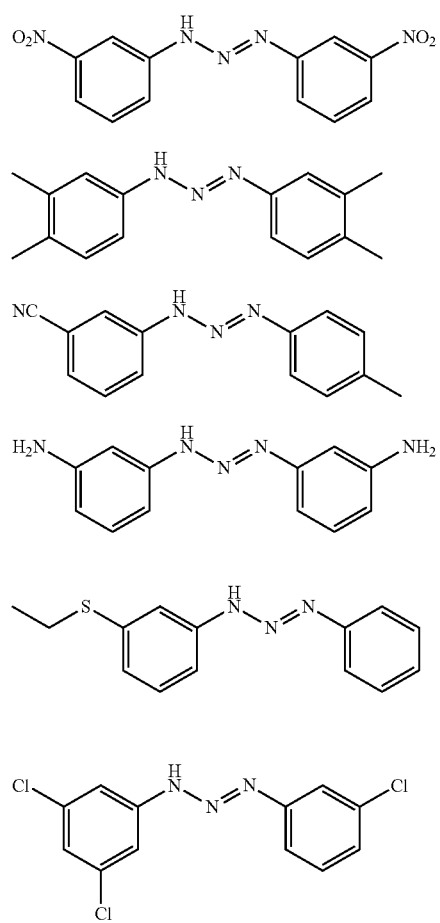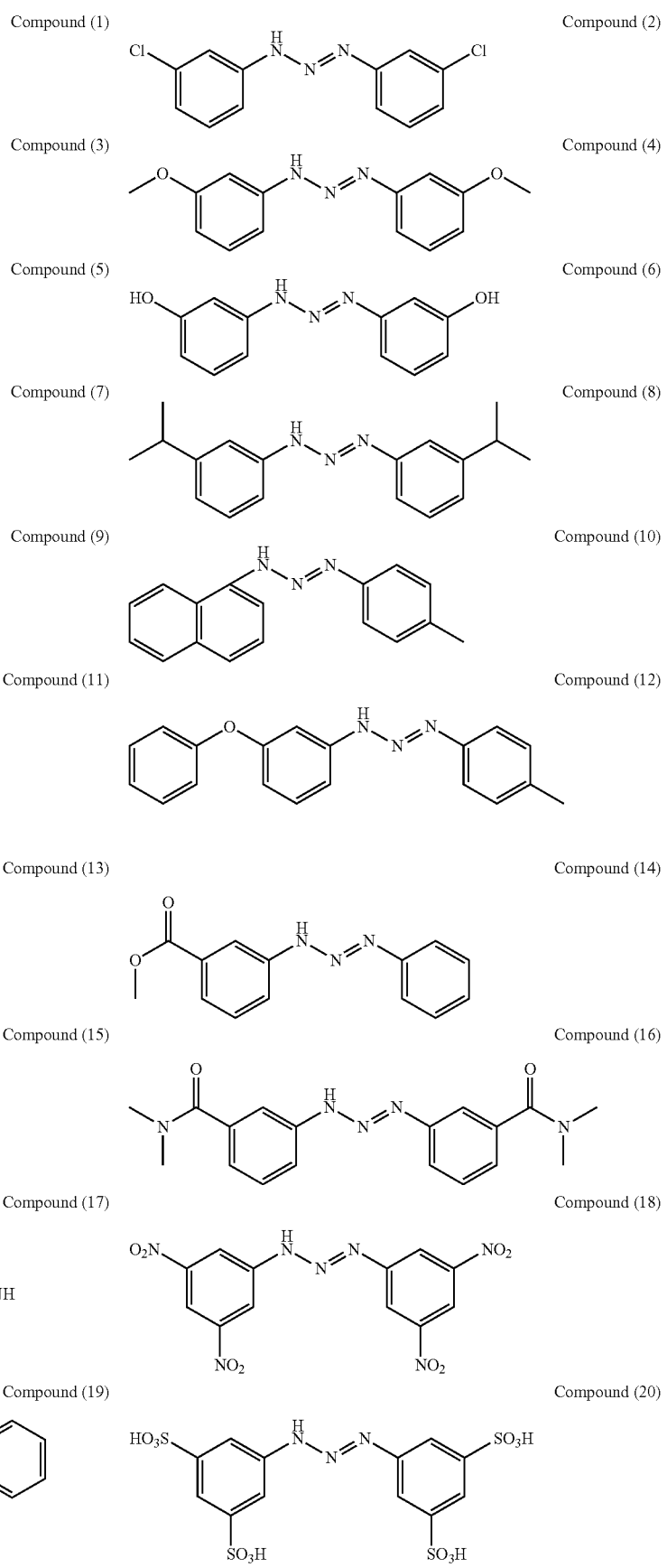

-continued
Compound (21)
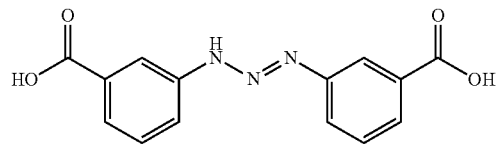
Compound (22)
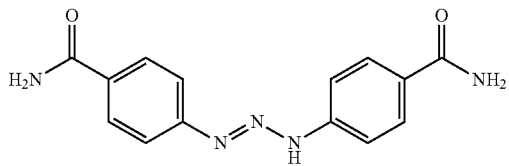
Compound (23)
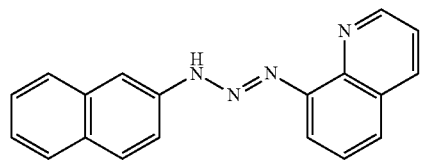
Compound (24)
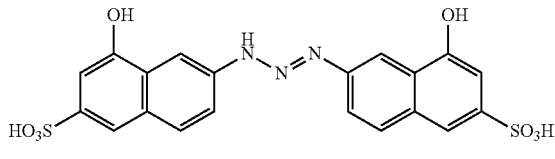
Compound (25)
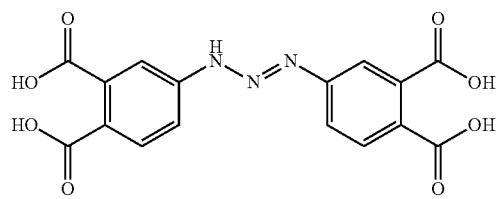
Compound (26)
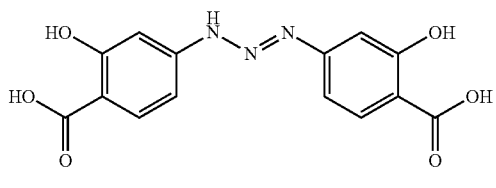
Compound (27)
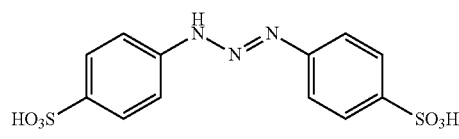
Compound (28)
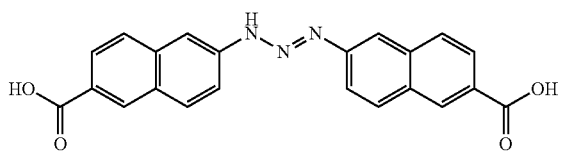
Compound (29)
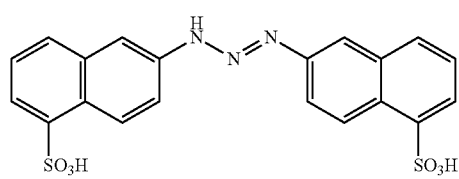
Compound (30)
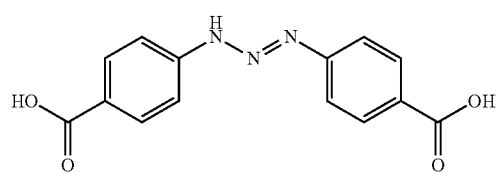
Compound (31)
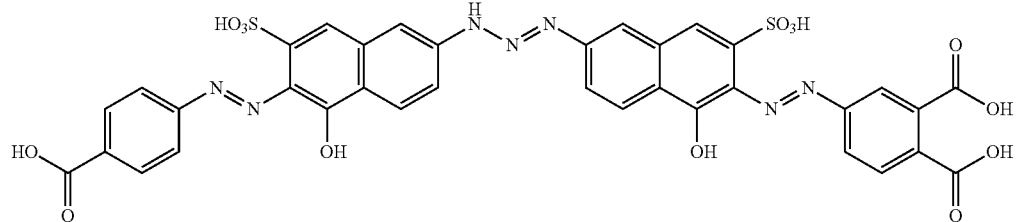
Compound (32)
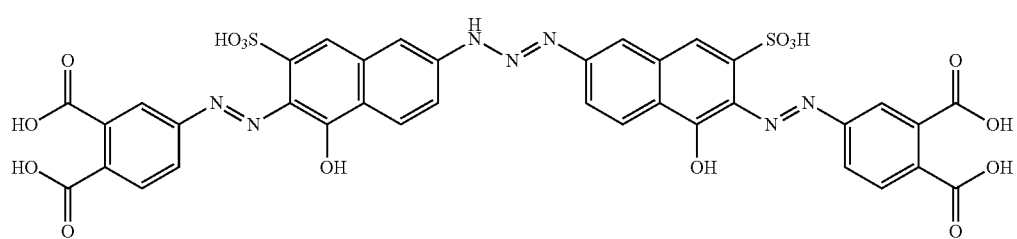
Compound (33)

Compound (34)
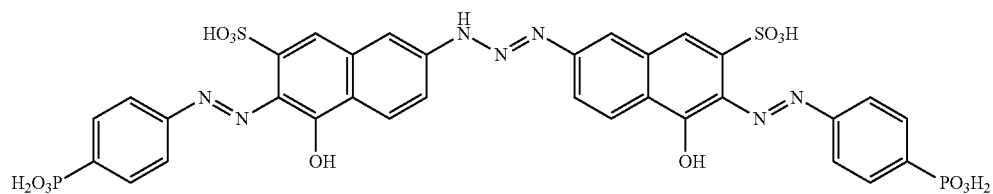
Compound (35)
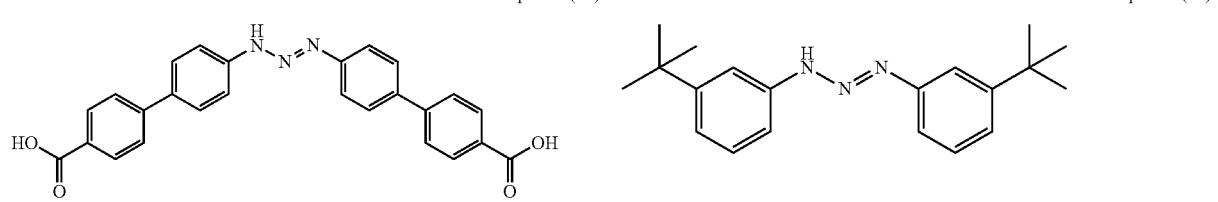
Compound (36)
Compound (37)
Compound (38)
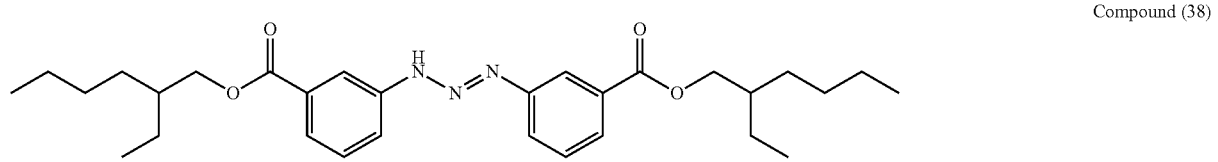
Compound (39)
Compound (40)
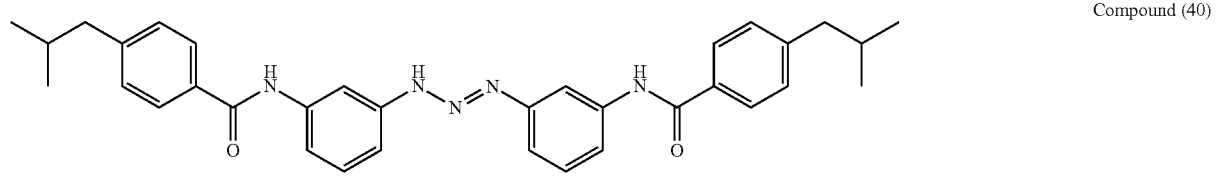
Compound (41)
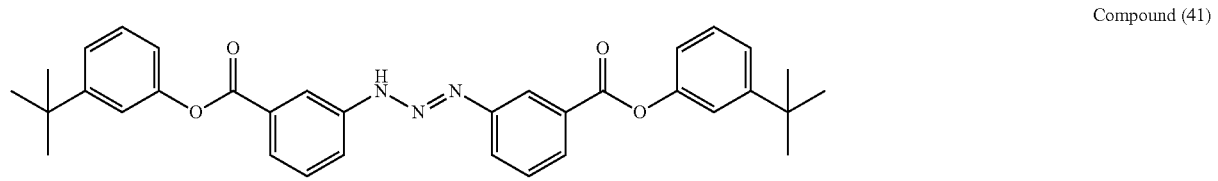
Compound (42)
Compound (43)
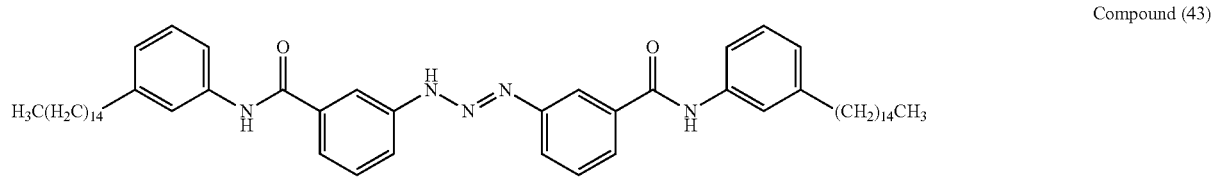

-continued
Compound (44)
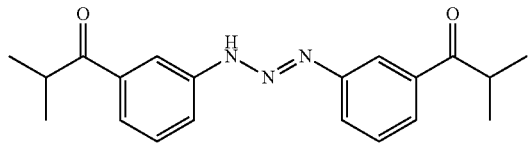
Compound (45)
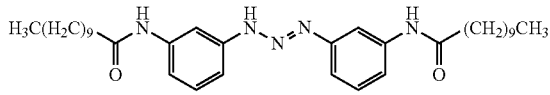
Compound (46)
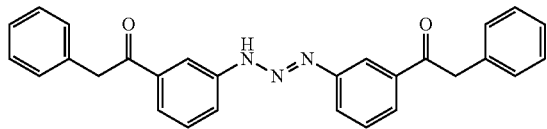
Compound (47)
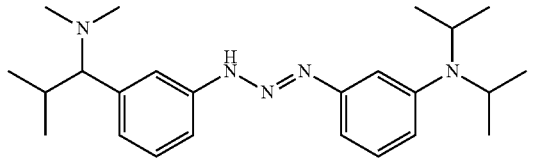
Compound (48)
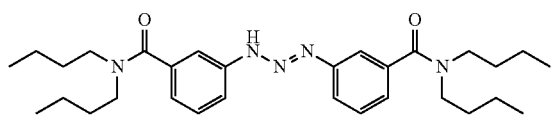
Compound (49)
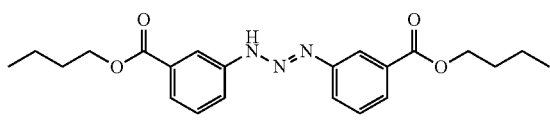
Compound (50)
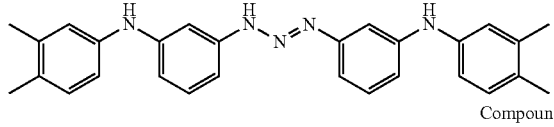
Compound (51)
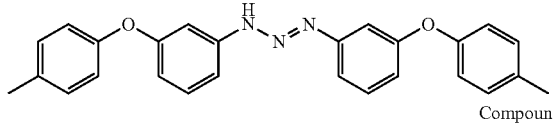
Compound (52)
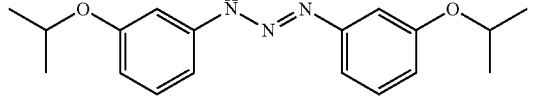
Compound (53)
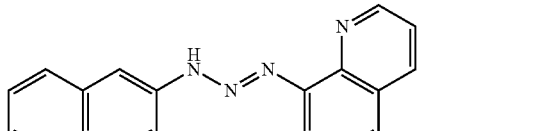
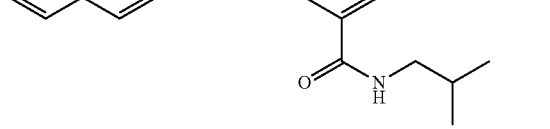
Compound (54)
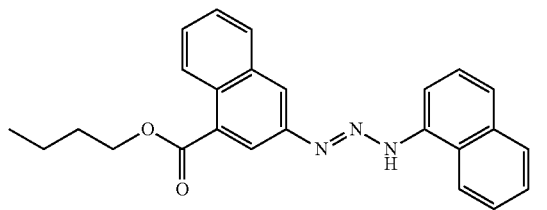
Compound (55)
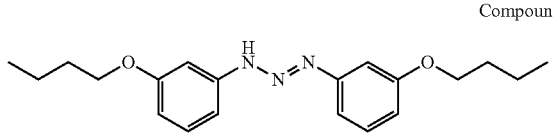
Compound (56)
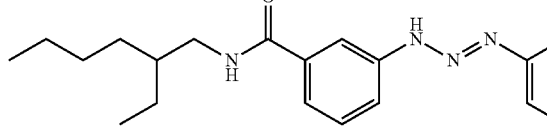
Compound (57)
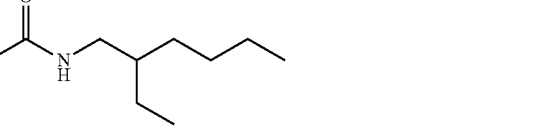
Compound (58)
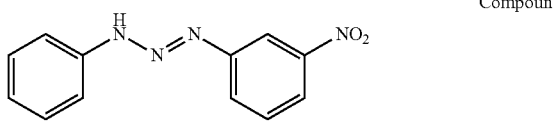
Compound (59)
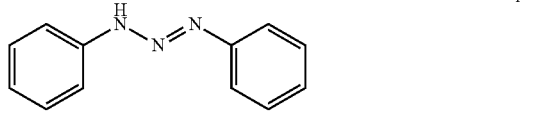
Compound (60)
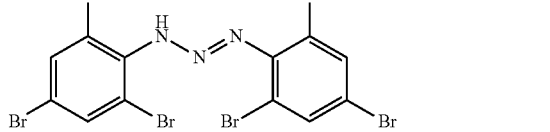
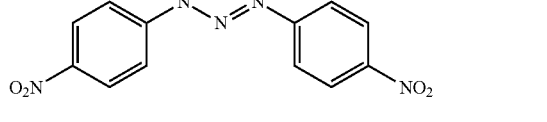
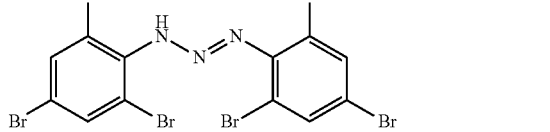

-continued
Compound (61)
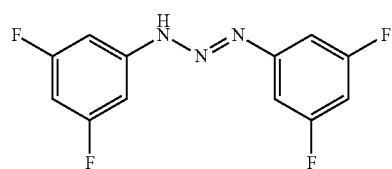
Compound (62)
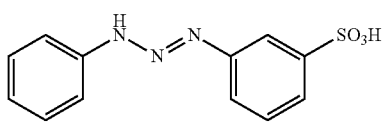
Compound (63)
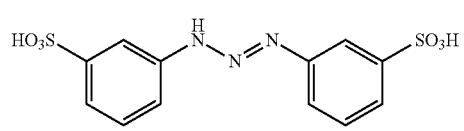
Compound (64)
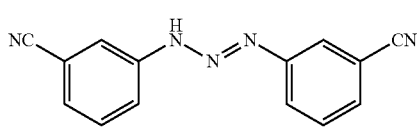
Compound (65)
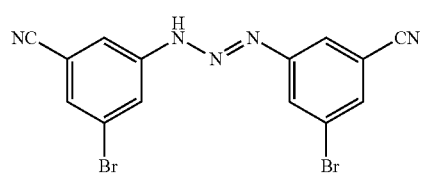
1p;1p
Compound (66)
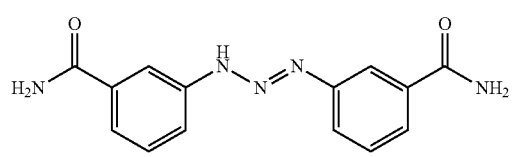
Compound (67)
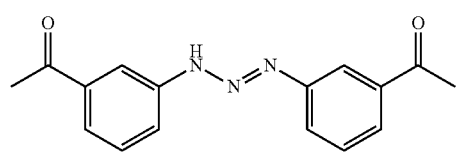
Compound (68)
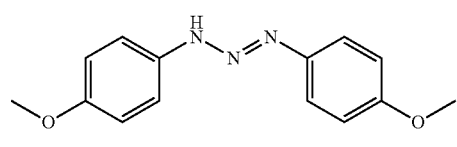
Compound (69)
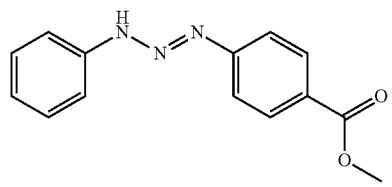
Compound (70)
Compound (71)
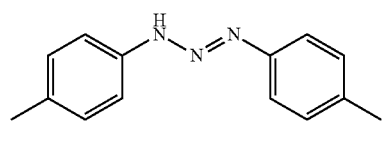
Compound (72)
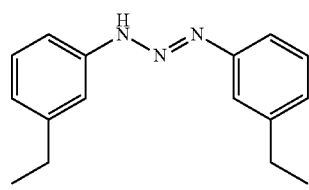
Compound (73)
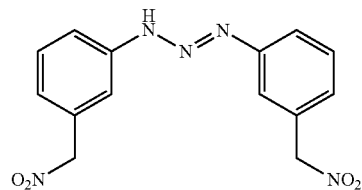
Compound (74)
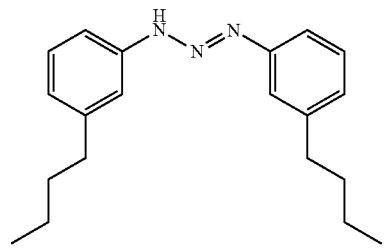

Compound (75)
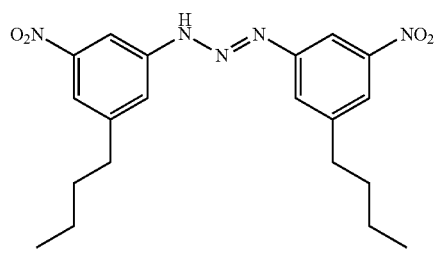
Compound (76)
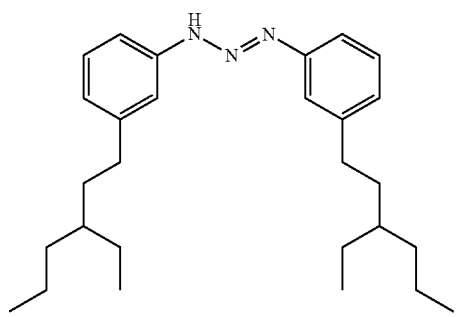
Compound (77)
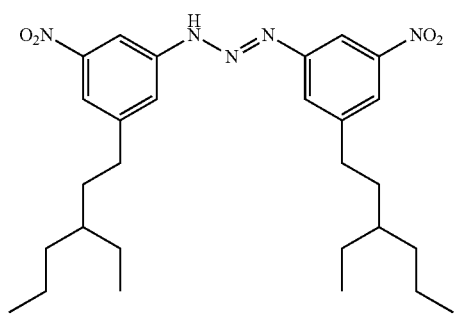
Compound (78)
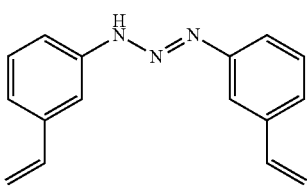
Compound (79)
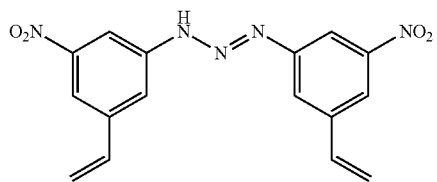
Compound (80)
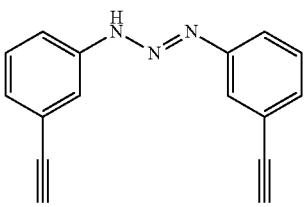
Compound (81)
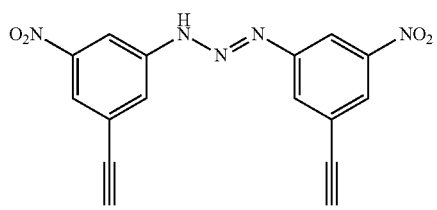
Compound (82)
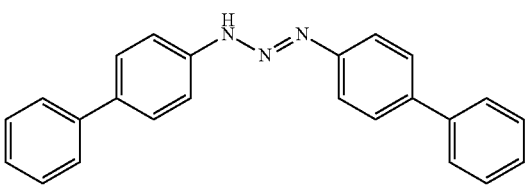
Compound (83)
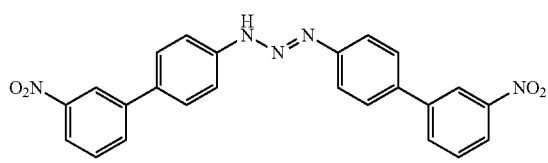
Compound (84)
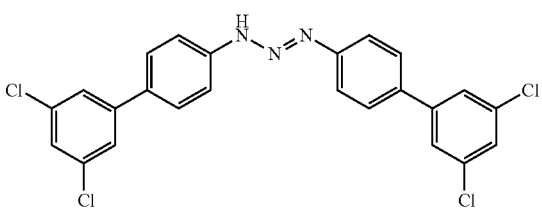
Compound (85)
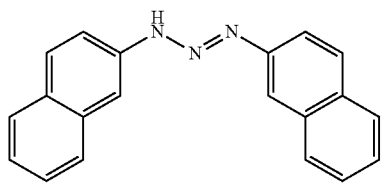
Compound (86)
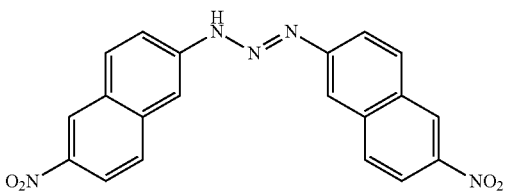

Compound (87)
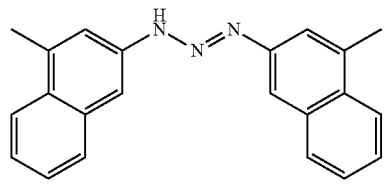

Compound (88)
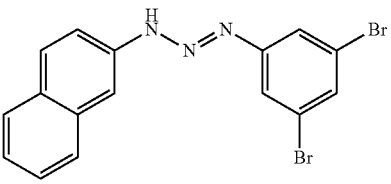

Compound (89)
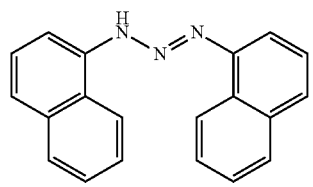

Compound (90)
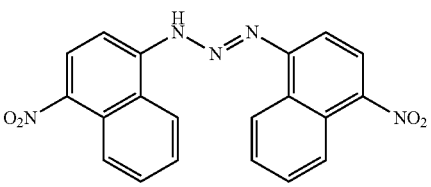

Compound (91)
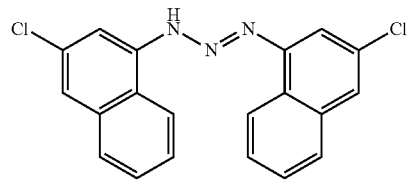

Compound (92)
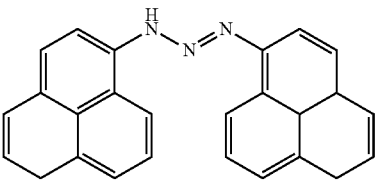

Compound (93)
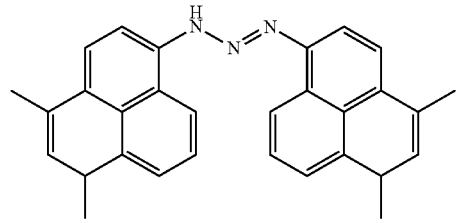

Compound (94)
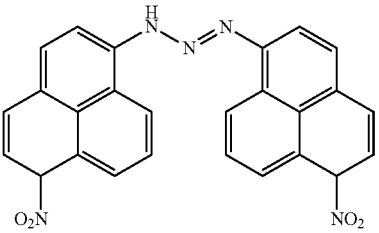

A common dispersant contains an adsorption group and a dispersion group. As the role of the dispersion group, the dispersion group needs to provide a structure suitable for a medium for an improvement of the affinity with the medium.

On the other hand, the affinity with a pigment is important in the adsorption group. In particular, when the medium is a nonaqueous medium, the structure of the adsorption group needs to be determined according to the skeleton of a pigment because an intermolecular interaction, such as a hydrogen bond with the pigment, is required.

However, it is considered that, due to the fact that the triazo structure has both the extension of conjugation and a hydrogen bonding donor-acceptor, the intermolecular interaction or the adsorption force to the skeleton of each pigment which has been examined is improved, and therefore stable dispersion is enabled, although the details are unclear.

Due to the fact that the dispersant is a high molecular weight compound, the viscosity of a dispersion increases in some cases even when a small amount of the dispersant is added, and therefore the dispersant is suitably a low molecular weight compound. The low molecular weight compound means a compound having a molecular weight of 5,000 or less. From the viewpoint of a viscosity increase and an improvement of dispersibility, the molecular weight of the dispersant is preferably Mn (Number average molecular weight)=200 to 5,000 and more preferably 280 to 2,000.

When the use amount of the triazo compound is 1 to 100 parts by mass and preferably 2 to 20 parts by mass based on 100 parts by mass of an organic solvent, the color development properties are particularly excellent.

Constituent Components of Pigment Dispersion

Each constituent component of the pigment dispersion is described below. The pigment dispersion contains an organic pigment and the triazo compound represented by Formula (1) as essential components and, as necessary, other additives, solvents, and the like other than the components above may be blended.

Organic Pigment

The pigment dispersion contains an organic pigment as an essential component, and pigments of various colors, such as red pigments, blue pigments, green pigments, yellow pigments, violet pigments, orange pigments, and black pigments, are usable as the organic pigment in view of the effects.

Examples of the chemical structure of the various pigments include organic pigments, such as an azo type, a phthalocyanine type, a quinacridone type, a benzimidazolone type, an isoindolinone type, a dioxazine type, an indanthrene type, a perylene type, and a carbon-based black pigment, for example.

Specific examples of usable pigments are given below with the pigment number but are not limited by these examples.

Examples of the red pigments include the following substances. Mentioned are C.I. Pigment Red 1, 2, 3, 4, 5, 6, 7, 8, 9, 12, 14, 15, 16, 17, 21, 22, 23, 31, 32, 37, 38, 41, 47, 48, 48:1, 48:2, 48:3, 48:4, 49, 49:1, 49:2, 50:1, 52:1, 52:2, 53, 53:1, 53:2, 53:3, 57, 57:1, 57:2, 58:4, 60, 63, 63:1, 63:2, 64, 64:1, 68, 69, 81, 81:1, 81:2, 81:3, 81:4, 83, 88, 90:1, 101, 101:1, 104, 108, 108:1, 109, 112, 113, 114, 122, 123, 144, 146, 147, 149, 150, 151, 166, 168, 169, 170, 172, 173, 174, 175, 176, 177, 178, 179, 181, 184, 185, 187, 188, 190, 193, 194, 200, 202, 206, 207, 208, 209, 210, 214, 216, 220, 221, 224, 230, 231, 232, 233, 235, 236, 237, 238, 239, 242, 243, 245, 247, 249, 250, 251, 253, 254, 255, 256, 257, 258, 259, 260, 262, 263, 264, 265, 266, 267, 268, 269, 270, 271, 272, 273, 274, 275, 276 and the like. Among the above, C.I. Pigment Red 48:1, 101, 104, 112, 122, 150, 168, 170, 176, 177, 202, 206, 207, 209, 224, 242, 254, 269, and the like are suitable. C.I. Pigment Red 101, 104, 112, 122, 150, 170, 176, 242, 254, 269, and the like are more suitable.

Examples of the blue pigments include the following substances. Mentioned are C.I. Pigment Blue 1, 1:2, 9, 14, 15, 15:1, 15:2, 15:3, 15:4, 15:6, 16, 17, 19, 25, 27, 28, 29, 33, 35, 36, 56, 56:1, 60, 61, 61:1, 62, 63, 66, 67, 68, 71, 72, 73, 74, 75, 76, 78, 79, and the like. Among the above, C.I. Pigment Blue 15, 15:1, 15:2, 15:3, 15:4, 15:6, 60, and the like are suitable and C.I. Pigment Blue 15:2, 15:3, and the like are more suitable.

Examples of the green pigments include the following substances. Mentioned are C.I. Pigment Green 1, 2, 4, 7, 8, 10, 13, 14, 15, 17, 18, 19, 26, 36, 45, 48, 50, 51, 54, 55, 58, and the like. Among the above, C.I. Pigment Green 7, 36, 58, and the like are suitable.

Examples of the yellow pigments include the following substances. Mentioned are C.I. Pigment Yellow 1, 1:1, 2, 3, 4, 5, 6, 9, 10, 12, 13, 14, 16, 17, 24, 31, 32, 34, 35, 35:1, 36, 36:1, 37, 37:1, 40, 41, 42, 43, 48, 53, 55, 61, 62, 62:1, 63, 65, 73, 74, 75, 81, 83, 87, 93, 94, 95, 97, 100, 101, 104, 105, 108, 109, 110, 111, 116, 117, 119, 120, 126, 127, 127:1, 128, 129, 133, 134, 136, 138, 139, 142, 147, 148, 150, 151, 153, 154, 155, 157, 158, 159, 160, 161, 162, 163, 164, 165, 166, 167, 168, 169, 170, 172, 173, 174, 175, 176, 180, 181, 182, 183, 184, 185, 188, 189, 190, 191, 191:1, 192, 193, 194, 195, 196, 197, 198, 199, 200, 202, 203, 204, 205, 206, 207, 208, and the like. Among the above, C.I. Pigment Yellow 12, 14, 34, 53, 74, 83, 117, 129, 138, 139, 150, 154, 155, 180, 185, and the like are suitable. Furthermore, C.I. Pigment Yellow 12, 14, 34, 53, 74, 83, 138, 150, 155, 180, 185, and the like are more suitable.

Examples of the violet pigments include the following substances. Mentioned are C.I. Pigment Violet 1, 1:1, 2, 2:2, 3, 3:1, 3:3, 5, 5:1, 14, 15, 16, 19, 23, 25, 27, 29, 31, 32, 37, 39, 42, 44, 47, 49, 50, and the like. Among the above, C.I. Pigment Violet 19, 23, and the like are suitable and C.I. Pigment Violet 23 and the like are more suitable.

Examples of the orange pigments include the following substances. Mentioned are C.I. Pigment orange 1, 2, 5, 13, 16, 17, 19, 20, 21, 22, 23, 24, 34, 36, 38, 39, 43, 46, 48, 49, 61, 62, 64, 65, 67, 68, 69, 70, 71, 72, 73, 74, 75, 77, 78, 79, and the like. Among the above, C.I. Pigment Orange 38, 71, and the like are suitable.

Examples of the black pigments include carbon black, carbon nanotube, graphene, graphene oxide, reduced graphene, modified graphene, expanded graphite, nanodiamond, and the like. Among the above, carbon black and the like are suitable and any carbon black, such as furnace black, lamp black, acetylene black, and channel black, is usable as the carbon black species.

Moreover, self-dispersible pigments of the pigments mentioned above are also usable. The self-dispersible pigment is obtained by being surface modified so that at least one kind of hydrophilic group is bonded to the pigment surface directly or through another atomic group. For the surface modification, a method, such as a method including chemically bonding a certain specific functional group (functional groups, such as a sulfone group and a carboxy group) to the pigment surface or a method including performing wet oxidation treatment using at least any one of hypohalous acid and a salt thereof, is used. Examples of the hydrophilic group include at least one kind of hydrophilic group selected from the group consisting of a carboxylic acid group, a sulfonic acid group, a phosphate group, and alkali metal salts thereof, and a hydroxy group. For example, —COOM, —SO$_3$M, —PO$_3$HM, —OH, and the like are mentioned. M is suitably hydrogen or alkali metal. Examples of the alkali metal include lithium, sodium, potassium, and the like.

Pigment Dispersion

The pigment dispersion is described. The dispersion medium refers to water, an organic solvent, or a mixture thereof.

The pigment dispersion is obtained by performing dispersion treatment of an organic pigment and the triazo compound represented by Formula (1) in the dispersion medium. Examples of the organic pigment include an azo type, a phthalocyanine type, a quinacridone type, a benzimidazolone type, an isoindolinone type, a dioxazine type, an indanthrene type, a perylene type, a carbon-based black pigment, and the like, for example.

As the dispersion treatment method, the following methods are mentioned, for example. The organic pigment and the triazo compound represented by Formula (1) and, as necessary, a resin are dissolved in a dispersion medium, and then are sufficiently mixed with the dispersion medium under stirring. Furthermore, by applying mechanical shearing force by a disperser, such as a ball mill, a paint shaker, a dissolver, an attritor, a sand mill, or a high speed mill, the organic pigment and the triazo compound can be stably finely dispersed into a uniform fine particle shape.

In the present disclosure, the amount of the organic pigment in the pigment dispersion is preferably 1 to 50 parts by mass based on 100 parts by mass of the dispersion medium. The amount is more preferably 2 to 30 parts by mass and particularly preferably 3 to 15 parts by mass. By setting the content of the organic pigment within the ranges mentioned above, a viscosity increase and a reduction in pigment compound dispersibility can be prevented and good tinting strength can be demonstrated.

With an increase in the amount of the triazo compound in the pigment dispersion, the dispersibility is further improved. However, the amount of the triazo compound is preferably 1 to 100 parts by mass based on 100 parts by mass of the organic pigment in order to prevent a reduction in color development properties.

The pigment dispersion can be dispersed in water using an emulsifier. Examples of the emulsifier include cationic surfactants, anionic surfactants, and nonionic surfactants, for example.

Examples of the cationic surfactants include the following substances. Mentioned are dodecyl ammonium chloride, dodecyl ammonium bromide, dodecyl trimethyl ammonium bromide, dodecyl pyridinium chloride, dodecyl pyridinium bromide, hexadecyl trimethyl ammonium bromide, and the like.

Examples of the anionic surfactants include fatty acid soaps, such as sodium stearate and sodium dodecanoate, sodium dodecyl sulfate, sodium lauryl sulfate, and the like.

Examples of the nonionic surfactants include the following substances. Mentioned are dodecyl polyoxyethylene ether, hexadecyl polyoxyethylene ether, nonylphenyl polyoxyethylene ether, lauryl polyoxyethylene ether, sorbitan monooleate polyoxyethylene ether, monodecanoyl sucrose, and the like.

Examples of the organic solvent to be used as the dispersion medium include the following substances. Mentioned are alcohols, such as methyl alcohol, ethyl alcohol, denatured ethyl alcohol, isopropyl alcohol, n-butyl alcohol, isobutyl alcohol, tert-butyl alcohol, sec-butyl alcohol, tert-amyl alcohol, 3-pentanol, octyl alcohol, benzyl alcohol, and cyclohexanol; glycols, such as methyl cellosolve, ethyl cellosolve, diethylene glycol, and diethylene glycol monobutyl ether; ketones, such as acetone, methyl ethyl ketone (2-butanone), and methyl isobutyl ketone; esters, such as ethyl acetate, butyl acetate, ethyl propionate, and cellosolve acetate; hydrocarbon-based solvents, such as hexane, octane, petroleum ether, cyclohexane, benzene, toluene, and xylene; halogenated hydrocarbon solvents, such as carbon tetrachloride, trichloroethylene, and tetrabromoethane; ethers, such as diethylether, ethylene glycol dimethyl ether, trioxane, and tetrahydrofuran; acetals, such as methylal and diethyl acetal; organic acids, such as formic acid, acetic acid, and propionic acid; and sulfur.nitrogen containing organic compounds, such as nitrobenzene, dimethylamine, monoethanolamine, pyridine, dimethylsulfoxide and dimethyl formamide.

Moreover, polymerizable monomers are also usable as the organic solvent. The polymerizable monomer is an addition polymerizable or condensation polymerizable monomer and is suitably an addition polymerizable monomer. Specifically, the following substances are mentioned. Mentioned are styrene-based monomers, such as styrene, o-methylstyrene, m-methylstyrene, p-methylstyrene, o-ethylstyrene, m-ethylstyrene, and p-ethylstyrene; acrylate-based monomers, such as methyl acrylate, ethyl acrylate, propyl acrylate, butyl acrylate, octyl acrylate, dodecyl acrylate, stearyl acrylate, behenyl acrylate, 2-ethylhexyl acrylate, dimethylaminoethyl acrylate, diethylaminoethyl acrylate, acrylonitrile, and acrylic acid amide; methacrylate-based monomers, such as methyl methacrylate, ethyl methacrylate, propyl methacrylate, butyl methacrylate, octyl methacrylate, dodecyl methacrylate, stearyl methacrylate, behenyl methacrylate, 2-ethylhexyl methacrylate, dimethylaminoethyl methacrylate, diethylaminoethyl methacrylate, methacrylonitrile, and amide methacrylate; olefin-based monomers, such as ethylene, propylene, butylene, butadiene, isoprene, isobutylene, and cyclohexene; vinyl halides, such as vinyl chloride, vinylidene chloride, vinyl bromide, and vinyl iodide; vinyl esters, such as vinyl acetate, vinyl propionate, and vinyl benzoate; vinyl ethers, such as vinyl methyl ether, vinyl ethyl ether, and vinyl isobutyl ether; and vinyl ketone compounds, such as vinyl methyl ketone, vinyl hexyl ketone, and methyl isopropenyl ketone. These substances can be used alone or in combination of two or more kinds thereof according to the intended use. When using the pigment dispersion for a polymerized toner, it is suitable to use styrene or the styrene-based monomers alone or as a mixture with other polymerizable monomers among the polymerizable monomers mentioned above. In view of the ease of handling, styrene is particularly suitable.

A resin may be further added to the pigment dispersion. The resin usable for the pigment dispersion is determined according to the intended use and is not particularly limited. Specifically, the following substances are mentioned, for example. Mentioned are a polystyrene resin, a styrene copolymer, a polyacrylic acid resin, a polymethacrylic acid resin, a polyacrylic acid ester resin, a polymethacrylic acid ester resin, an acrylic acid-based copolymer, a methacrylic acid-based copolymer, a polyester resin, a polyvinyl ether resin, a polyvinyl methyl ether resin, a polyvinyl alcohol resin, a polyvinyl butyral resin, and the like. These substances can be used alone or as a mixture of two or more kinds thereof.

Configuration of Toner

Next, a method for manufacturing a toner using the pigment dispersion is described. The toner contains a binding resin and toner particles containing a colorant. By the use of the pigment dispersion when manufacturing a toner, an increase in dispersion viscosity can be prevented in a dispersion medium, and therefore the handling in a toner manufacturing process is facilitated and the dispersibility of the colorant is kept good, and therefore a toner having high tinting strength can be provided.

Binding Resin

As the binding resin, thermoplastic resin and the like can be mentioned, for example.

Specifically, the following substances are mentioned. Mentioned are homopolymers or copolymers of styrene (styrene-based resin), such as styrene, p-chlorostyrene, and α-methylstyrene; homopolymers or copolymers of esters having vinyl groups (vinyl-based resin), such as methyl acrylate, ethyl acrylate, n-propyl acrylate, n-butyl acrylate, lauryl acrylate, 2-ethylhexyl acrylate, methyl methacrylate, ethyl methacrylate, n-propyl methacrylate, lauryl methacrylate, and 2-ethylhexyl methacrylate; homopolymers or copolymers of vinyl nitriles (vinyl-based resin), such as acrylonitrile and methacrylonitrile; vinyl ether homopolymers or copolymers (vinyl-based resin), such as vinyl ethyl ether and vinyl isobutyl ether; homopolymers or copolymers (vinyl-based resin) of vinyl methyl ketone, vinyl ethyl ketone, and vinyl isopropenyl ketones; homopolymers or copolymers of olefins (olefin-based resin), such as ethylene, propylene, butadiene, and isoprene; non-vinyl condensation resin, such as an epoxy resin, a polyester resin, a polyurethane resin, a polyamide resin, a cellulosic resin, and a polyether resin; graft polymers of the non-vinyl condensation resin and vinyl-based monomers, and the like. The resin may be used alone or in combination of two or more kinds thereof.

The polyester resin is synthesized from an acid component (dicarboxylic acid) and an alcohol component (diol). The polyester resin has a constitution site originating from the acid component and a constitution site originating from the alcohol component.

Examples of the acid component include aliphatic dicarboxylic acid, dicarboxylic acid having a double bond, dicarboxylic acid having a sulfonic acid group, and the like, for example. Specifically, the following substances are mentioned. Mentioned are oxalic acid, malonic acid, succinic acid, glutaric acid, adipic acid, pimelic acid, suberic acid, azelaic acid, sebacic acid, 1,9-nonanedicarboxylic acid, 1,10-decanedicarboxylic acid, 1,11-undecanedicarboxylic acid, 1,12-dodecane dicarboxylic acid, 1,13-tridecane dicarboxylic acid, 1,14-tetradecane dicarboxylic acid, 1,16-hexadecane dicarboxylic acid, 1,18-octadecane dicarboxylic acid, lower alkyl esters or acid anhydrides thereof, and the like. In particular, the aliphatic dicarboxylic acid is suitable and further it is suitable that the aliphatic site in the aliphatic dicarboxylic acid is saturated carboxylic acid.

As the alcohol component, aliphatic diol is suitable, for example. Specifically, the following substances are mentioned. Mentioned are ethylene glycol, 1,3-propanediol, 1,4-butanediol, 1,5 pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, 1,20-eicosanediol, and the like.

In the present disclosure, a crosslinking agent is also usable in the synthesis of the binding resin in order to increase the mechanical strength of toner particles and control the molecular weight of toner molecules.

As the crosslinking agent, the following substances are mentioned as a bifunctional crosslinking agent, for example. Mentioned are divinylbenzene, bis(4-acryloxyethoxyphenyl)propane, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, diacrylates of polyethylene glycols #200, #400, and #600, dipropylene glycol diacrylate, polypropylene glycol diacrylate, polyester type diacrylate, and those been replaced the diacrylates mentioned above by dimethacrylates.

As polyfunctional crosslinking agents, the following substances are mentioned, for example. Mentioned are pentaerythritol triacrylate, trimethylolethane triacrylate, trimethylolpropane triacrylate, tetramethylolmethane tetracrylate, origoester acrylate, and methacrylate thereof, 2,2-bis(4-methacryloxyphenyl)propane, diallyl phthalate, triallyl cyanurate, triallyl isocyanurate, and triallyl trimellitate.

These crosslinking agents are used in a proportion of preferably 0.05 to 10 parts by mass and more preferably 0.1 to 5 parts by mass based on 100 parts by mass of the polymerizable monomer.

Wax may be contained in toner particles. As the wax, the following substances are mentioned, for example. Mentioned are petroleum-based wax, such as paraffin wax, microcrystalline wax, and petrolatum and a derivative thereof; montan wax and a derivative thereof; a hydrocarbon wax obtained by the Fischer-Tropsch process and a derivative thereof; polyolefin wax, such as polyethylene and polypropylene wax, and a derivative thereof; and natural wax, such as carnauba wax and candelilla wax, and a derivative thereof. The derivatives thereof also include oxides, block copolymers with vinyl monomers, and graft-modified products. Furthermore, alcohols, such as higher aliphatic alcohols, fatty acids, such as stearic acid and pulmitic acid, or a compound thereof, acid amide wax, ester wax, ketone, hydrogenated castor oil and a derivative thereof, plant wax, and animal wax are mentioned. The wax can be used alone or in combination of two or more kinds thereof.

The wax is suitably contained in a proportion of 2.5 to 15 parts by mass based on 100 parts by mass of the binding resin. The content is more preferably in the range of 3 to 10 parts by mass. The content in the range of 2.5 to 15 parts by mass is suitable because oilless fixation is improved, an excess amount of wax is not present on the surface of toner particles, and desired charge characteristic can be obtained.

The wax is suitably one having a melting point of 50° C. or more and 200° C. or less and is more suitably one having a melting point of 55° C. or more and 150° C. or less. The melting point indicates the endothermic peak temperature in the differential scanning calorimetry (DSC) curve measured according to ASTM D3418-82. Specifically, a differential scanning calorimeter (manufactured by Mettler-Toledo: DSC822) is used, the measurement temperature range is set to 30 to 200° C., the temperature increase rate is set to 5° C./min, and then the DSC curve in the temperature range of 30 to 200° C. is obtained based on the second temperature increase process in a normal temperature and normal humidity environment. Then, the endothermic peak temperature in the obtained DSC curve is the melting point of the wax.

In the toner, a charge control agent may be used by being mixed with toner particles as necessary. As the charge control agent, known substances can be utilized. Examples of those controlling the tonner to be negatively charged include the following substances. Mentioned are polymers or copolymers having a sulfonic acid group, a sulfonate group, or a sulfonic acid ester group, and a salicylic acid derivative and a metal complex thereof. Mentioned are a monoazo metallic compound, an acetylacetone metallic compound, aromatic oxycarboxylic acid, aromatic monocarboxylic acid and polycarboxylic acid, and metal salts, anhydrides, esters thereof. Mentioned are phenol derivatives, such as bisphenol, a urea derivative, a metal containing naphthoic acid-based compound, a boron compound, a quaternary ammonium salt, calixarene, and a resin-based charge control agent.

Examples of those controlling the tonner to be positively charged include the following substances. Mentioned are nigrosine, a nigrosine-modified product modified by a fatty acid metal salt and the like, a guanidine compound, an imidazole compound, quaternary ammonium salts, such as a tributylbenzylammonium-1-hydroxy-4-naphthosulfonic acid salt and tetrabutylammonium tetrafluoroborate, onium salts, such as phosphonium salts, which are analogues thereof and lake pigments thereof, triphenylmethane dyes and lake pigments thereof (Examples of laking agents include phosphotungstic acid, phosphomolybdic acid, phosphotungstic molybdic acid, tannic acid, lauric acid, gallic acid, ferricyanide, ferrocyanide, and the like.), metal salts of higher fatty acids, diorganotin oxides, such as dibutyltin oxide, dioctyltin oxide, and dicyclohexyltin oxide, diorganotin borates, such as dibutyltin borate, dioctyltin borate, and dicyclohexyltin borate, and a resin-based charge control agent. The charge control agents can be used alone or in combination of two or more kinds thereof.

To the toner, inorganic fine powder may be externally added as an external additive improving the flowability. As the inorganic fine powder, fine powder of silica, titanium oxide, alumina, or double oxides thereof, and those obtained by surface treating the same, are usable.

It is suitable for the toner to have a weight average particle diameter (D4) of 4.0 to 9.0 μm and have a ratio of the weight average particle diameter to the number average particle diameter (D1) (hereinafter also referred to as D4/D1) of 1.35 or less. Furthermore, it is more suitable that the weight average particle diameter (D4) is 4.9 to 7.5 μm and the D4/D1 is 1.30 or less. When the weight average particle diameter is 4.0 μm or more, the charge stability is improved and image degradations, such as image fogging and development stripes, are prevented in a continuous development operation (durability operation) of a large number of sheets. Moreover, when the weight average particle diameter is 9.0 μm or less, the reproducibility of a halftone portion is improved. When the D4/D1 is 1.35 or less, fogging and transferability are further improved and a thickness variation of the line width of a thin line and the like decreases.

The toner has an average circularity of the toner measured with a flow type particle image analyzer of preferably 0.930 to 0.995 and more preferably 0.960 to 0.990 from the viewpoint that the transferability of the toner is sharply improved.

Method for Manufacturing Toner

Toner particles to be manufactured by a suspension polymerization method are manufactured as follows, for example.

First, a colorant containing a pigment dispersion, a polymerizable monomer, wax, a polymerization initiator, and the like are mixed to prepare a polymerizable monomer composition (preparation process).

Next, the polymerizable monomer composition is dispersed in an aqueous medium containing a dispersion stabilizer prepared beforehand to form particles of the polymerizable monomer composition in the aqueous medium (granulation process).

Thereafter, the polymerizable monomer in a suspension is polymerized to obtain a binding resin (polymerization process).

After polymerizing the polymerizable monomer to obtain the binding resin, desolvation treatment is performed as necessary, so that a water dispersion liquid of toner particles is formed. Thereafter, cleaning is performed as necessary and then drying, classification, and external additive treatment are performed by various methods, whereby a toner can be obtained.

The above-described polymerizable monomer composition is suitably one prepared by mixing a dispersion liquid in which a colorant is dispersed in a first polymerizable monomer with a second polymerizable monomer. More specifically, the colorant containing the pigment dispersion is sufficiently dispersed by the first polymerizable monomer, and then mixed with the second polymerizable monomer together with other toner materials, whereby a pigment compound can be present in toner particles in a better dispersion state.

As the polymerization initiator, known polymerization initiators can be mentioned and, for example, an azo compound, an organic peroxide, an inorganic peroxide, an organometallic compound, a photopolymerization initiator, and the like are mentioned. Specifically, the following substances are mentioned. Mentioned are azo-based polymerization initiators, such as 2,2'-azobis(isobutyronitrile), 2,2'-azobis(2-methylbutyronitrile), 2,2'-azobis(4-methoxy-2,4-dimethylvaleronitrile), 2,2'-azobis(2,4-dimethylvaleronitrile), and dimethyl 2,2'-azobis(isobutyrate); organic peroxide-based polymerization initiators, such as benzoyl peroxide, di-tert-butylperoxide, tert-butyl-peroxyisopropyl monocarbonate, tert-hexylperoxybenzoate, and tert-butylperoxybenzoate; inorganic peroxide-based polymerization initiators, such as potassium peroxodisulfate and ammonium persulfate; and redox initiators, such as a hydrogen peroxide-ferrous type, a BPO-dimethylaniline type, and a cerium (IV) salt-alcohol type. As the photopolymerization initiator, an acetophenone type, a benzoin ether type, a ketal type, and the like are mentioned. The polymerization initiators can be used alone or in combination of two or more kinds thereof.

The addition amount of the polymerization initiator is preferably in the range of 0.1 to 20 parts by weight and more preferably in the range of 0.1 to 10 parts by weight based on 100 parts by weight of the polymerizable monomer. The type of the polymerizable initiator slightly varies according to polymerize methods and the polymerizable initiators are used alone or as a mixture referring to the 10-hour half-life temperature.

As the dispersion stabilizer, known inorganic and organic dispersion stabilizers are usable. Examples of the inorganic dispersion stabilizer include the following substances, for example. Mentioned are calcium phosphate, magnesium phosphate, aluminum phosphate, zinc phosphate, magnesium carbonate, calcium carbonate, calcium hydroxide, magnesium hydroxide, aluminum hydroxide, calcium metasilicate, calcium sulfate, barium sulfate, bentonite, silica, alumina, and the like. Examples of the organic dispersion stabilizer include polyvinyl alcohol, gelatin, methyl cellulose, methyl hydroxypropyl cellulose, ethyl cellulose, a sodium salt of carboxymethylcellulose, starch, and the like, for example. Moreover, nonionic, anionic, and cationic surfactants are also usable. For example, mentioned are sodium dodecyl sulfate, sodium tetradecyl sulfate, sodium pentadecyl sulfate, sodium octyl sulfate, sodium oleate, sodium laurate, potassium stearate, calcium oleate, and the like are mentioned.

Among the dispersion stabilizers, poorly water soluble inorganic dispersion stabilizers soluble in acid are suitably used. When an aqueous dispersion medium is prepared using the poorly water soluble inorganic dispersion stabilizers, it is suitable to use these dispersion stabilizers in the range of 0.2 to 2.0 parts by weight based on 100 parts by weight of the polymerizable monomer in view of the liquid droplet stability in the aqueous medium of the polymerizable monomer composition. It is suitable to prepare the aqueous medium using water in the range of 300 to 3,000 parts by weight based on 100 parts by weight of the polymerizable monomer composition.

In preparing the aqueous medium in which the poorly water soluble inorganic dispersion stabilizer is dispersed, it is suitable to generate the poorly water soluble inorganic dispersion stabilizer in water under high-speed stirring in order to obtain dispersion stabilizer particles having a fine and uniform particle size. For example, when using calcium phosphate as the dispersion stabilizer, a suitable dispersion stabilizer can be obtained by mixing an aqueous sodium phosphate solution and an aqueous calcium chloride solution under high-speed stirring to form fine particles of calcium phosphate.

EXAMPLES

Hereinafter, the present disclosure is described in more detail with reference to Examples and Comparative Examples but the invention is not limited to Examples. In the following description, "part(s)" and "%" are on a mass basis unless otherwise particularly specified. As an analyzer for identification, a MALDI MS (autoflex device, manufactured by Bruker Daltonics K.K.) was used. A negative ion mode was adopted as a detection mode in the MALDI MS.

Manufacturing Example 1: Manufacturing of Compound (1)

27 parts of 3-nitroaniline was suspended in a solution of 50 parts of hydrochloric acid and 150 parts of methanol, and then cooled to 0° C. in an ice bath. To the suspension, 14 parts of sodium nitrite and 25 parts of purified water were gently added dropwise while suppressing the temperature in a container to 5° C. or less, and then stirred to give a beige suspension of diazonium salt. In another container, 27 parts of 3-aminobenzoic acid and 49 parts of sodium acetate were suspended in 300 parts of methanol, and then cooled to 0° C. in an ice bath. The total amount of the diazonium salt solution prepared above was slowly added thereto, and then stirred at room temperature through the night. The reaction mixture was suction-filtered, a solid was washed with 500 parts of purified water and 100 parts of methanol, and then vacuum-dried to give a compound (1) (90% yield).
Analysis Result about Compound (1)
Mass spectrometry by MALDI-TOF-MS: m/z=286.025 ($M^+$: Molecular ion peak)

Manufacturing Example 2: Manufacturing of Compound (2)

A compound (2) was obtained (87% yield) by the same manufacturing method as that of Manufacturing Example 1, except changing the 3-nitroaniline to 3-chloroaniline.

Analysis Result about Compound (2)
Mass spectrometry by MALDI-TOF-MS: m/z=265.031 (M$^+$)

Manufacturing Example 3: Manufacturing of Compound (5)

A compound (5) was obtained (65% yield) by the same manufacturing method as that of Manufacturing Example 1, except changing the 3-nitroaniline to 3-cyanoaniline and 4-methylaniline.
Analysis Result about Compound (5)]
Mass spectrometry by MALDI-TOF-MS: m/z=236.358 (M$^+$)

Manufacturing Example 4: Manufacturing of Compound (6)

A compound (6) was obtained (32% yield) by the same manufacturing method as that of Manufacturing Example 1, except changing the 3-nitroaniline to 3-aminophenol.
Analysis Result about Compound (6)
Mass spectrometry by MALDI-TOF-MS: m/z=229.194 (M$^+$)

Manufacturing Example 5: Manufacturing of Compound (9)

A compound (9) was obtained (61% yield) by the same manufacturing method as that of Manufacturing Example 1, except changing the 3-nitroaniline to 14 parts of 3-ethylsulfonylaniline and 14 parts of aniline.
Analysis Result about Compound (9)
Mass spectrometry by MALDI-TOF-MS: m/z=257.314 (M$^+$)

Manufacturing Example 6: Manufacturing of Compound (10)

A compound (10) was obtained (52% yield) by the same manufacturing method as that of Manufacturing Example 1, except changing the 3-nitroaniline to 14 parts of 1-naphthylamine and 14 parts of 3-methylaniline.
Analysis Result about Compound (10)
Mass spectrometry by MALDI-TOF-MS: m/z=261.127 (M$^+$)

Manufacturing Example 7: Manufacturing of Compound (18)

A compound (18) was obtained (89% yield) by the same manufacturing method as that of Manufacturing Example 1, except changing the 3-nitroaniline to 3,5-dinitroaniline.
Analysis Result about Compound (18)
Mass spectrometry by MALDI-TOF-MS: m/z=377.409 (M$^+$)

Manufacturing Example 8: Manufacturing of Compound (19)

A compound (19) was obtained (83% yield) by the same manufacturing method as that of Manufacturing Example 1, except changing the 3-nitroaniline to 3-aminobinaphthyl.
Analysis Result about Compound (19)
Mass spectrometry by MALDI-TOF-MS: m/z=349.711 (M$^+$)

Manufacturing Example 9: Manufacturing of Compound (25)

A compound (25) was obtained (80% yield) by the same manufacturing method as that of Manufacturing Example 1, except changing the 3-nitroaniline to 4-aminophthalic acid.
Analysis Result about Compound (25)
Mass spectrometry by MALDI-TOF-MS: m/z=372.913 (M$^+$)

Manufacturing Example 10: Manufacturing of Compound (27)

A compound (27) was obtained (87% yield) by the same manufacturing method as that of Manufacturing Example 1, except changing the 3-nitroaniline to 4-aminobenzenesulfonic acid.
Analysis Result about Compound (27)
Mass spectrometry by MALDI-TOF-MS: m/z=355.031 (M$^+$)

Manufacturing Example 11: Manufacturing of Compound (30)

A compound (30) was obtained (91% yield) by the same manufacturing method as that of Manufacturing Example 1, except changing the 3-nitroaniline to 4-aminobenzenephosphonic acid.
Analysis result about Compound (30)
Mass spectrometry by MALDI-TOF-MS: m/z=353.269 (M$^+$)

Manufacturing Example 12: Manufacturing of Compound (31)

A compound (31) was obtained (86% yield) by the same manufacturing method as that of Manufacturing Example 1, except changing the 3-nitroaniline to 4-aminobenzoic acid.
Analysis result about Compound (31)
Mass spectrometry by MALDI-TOF-MS: m/z=284.725 (M$^+$)

Manufacturing Example 13: Manufacturing of Compound (37)

A compound (37) was obtained (47% yield) by the same manufacturing method as that of Manufacturing Example 1, except changing the 3-nitroaniline to 3-octylaniline.
Analysis Result about Compound (37)
Mass spectrometry by MALDI-TOF-MS: m/z=420.954 (M$^+$)

Manufacturing Example 14: Manufacturing of Compound (38)

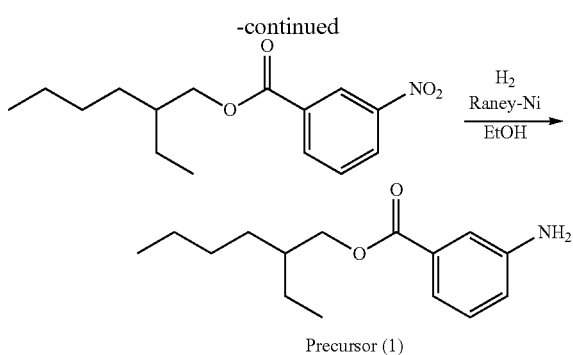

Precursor (1)

A precursor (1) was synthesized according to the scheme above.

Thereafter, a compound (38) was obtained (83% yield) by the same manufacturing method as that of Manufacturing Example 1, except changing the 3-nitroaniline to the precursor (1).

Analysis Result about Compound (38)
Mass spectrometry by MALDI-TOF-MS: m/z=510.325 ($M^+$)

Manufacturing Example 15: Manufacturing of Compound (44)

A compound (44) was obtained (68% yield) by the same manufacturing method as that of Manufacturing Example 1, except changing the 3-nitroaniline to 1-(3-aminophenyl)-2-methylpropanone.

Analysis Result about Compound (44)
Mass spectrometry by MALDI-TOF-MS: m/z=336.984 ($M^+$)

Manufacturing Example 16: Manufacturing of Compound (45)

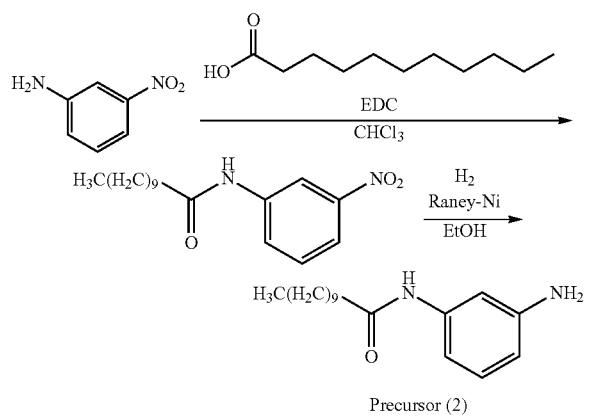

Precursor (2)

A precursor (2) was synthesized according to the scheme above.

Thereafter, a compound (45) was obtained (80% yield) by the same manufacturing method as that of Manufacturing Example 1, except changing the 3-nitroaniline to the precursor (2).

Analysis Result about Compound (45)
Mass spectrometry by MALDI-TOF-MS: m/z=562.419 ($M^+$)

Manufacturing Example 17: Manufacturing of Compound (47)

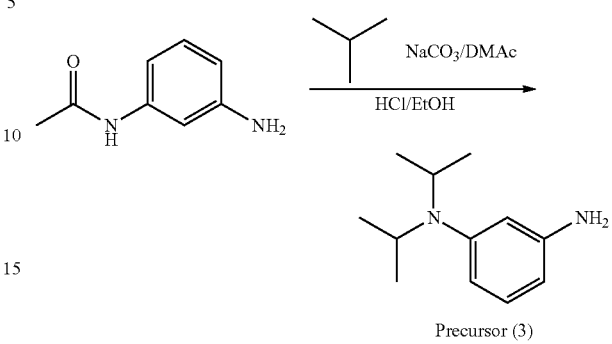

Precursor (3)

A precursor (3) was synthesized according to the scheme above.

Thereafter, a compound (47) was obtained (86% yield) by the same manufacturing method as that of Manufacturing Example 1, except changing the 3-nitroaniline to the precursor (3).

Analysis Result about Compound (47)
Mass spectrometry by MALDI-TOF-MS: m/z=394.305 ($M^+$)

Manufacturing Example 18: Manufacturing of Compound (48)

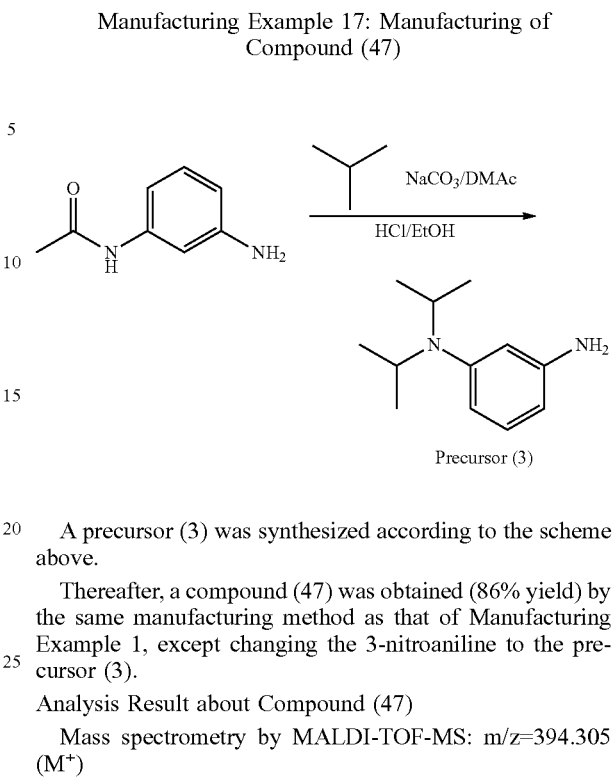

Precursor (4)

A precursor (4) was synthesized according to the scheme above.

Thereafter, a compound (48) was obtained (80% yield) by the same manufacturing method as that of Manufacturing Example 1, except changing the 3-nitroaniline to the precursor (4).

Analysis Result about Compound (48)
Mass spectrometry by MALDI-TOF-MS: m/z=507.257 (M$^+$)

Manufacturing Example 19: Manufacturing of Compound (55)

A compound (55) was obtained (87% yield) by the same manufacturing method as that of Manufacturing Example 1, except changing the 3-nitroaniline to 3-butoxy phenylamine.
Analysis Result about Compound (55)
Mass spectrometry by MALDI-TOF-MS: m/z=341.210 (M$^+$)

Manufacturing Example 20: Manufacturing of Compound (56)

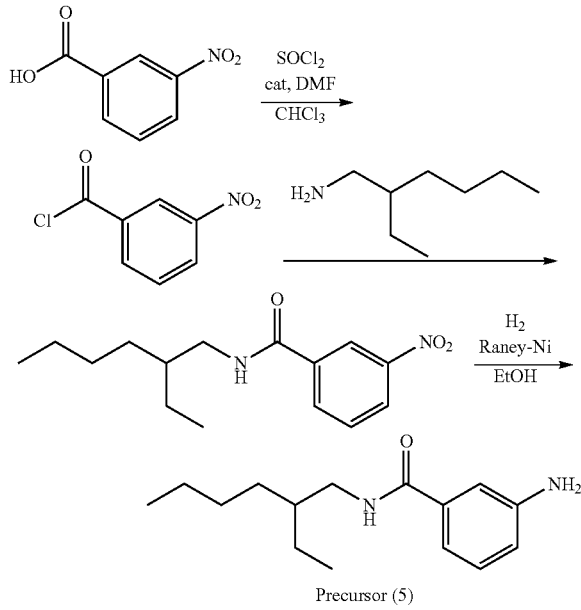

Precursor (5)

A precursor (5) was synthesized according to the scheme above.
Thereafter, a compound (56) was obtained (80% yield) by the same manufacturing method as that of Manufacturing Example 1, except changing the 3-nitroaniline to the precursor (5).
Analysis Result about Compound (56)
Mass spectrometry by MALDI-TOF-MS: m/z=507.357 (M$^+$)

Manufacturing Example 21: Manufacturing of Compound (90)

A compound (90) was obtained (62% yield) by the same manufacturing method as that of Manufacturing Example 1, except changing the 3-nitroaniline to 4-nitro-1-naphthylamine.
Analysis Result about Compound (90)
Mass spectrometry by MALDI-TOF-MS: m/z=388.192 (M$^+$)
Manufacturing of Pigment Dispersion
Pigment dispersions of the present disclosure and pigment dispersions for comparison were manufactured by methods described below.

Manufacturing Example 1 of Pigment Dispersion 400 parts of an organic pigment, 20 parts of the triazo compound, 350 parts of toluene, 350 parts of ethyl acetate, and 300 parts of 2-butanone as a dispersion medium, and 750 parts of glass beads (1 mm in diameter) were mixed, and then dispersed for 3 hours by an Attritor [manufactured by NIPPON COKE &. ENGINEERING CO., LTD.]. Thereafter, the resultant substance was filtered with a mesh to individually obtain pigment dispersions. The used organic pigments are pigments (1) to (18) shown in Table 1. A self-dispersible carbon black used as a pigment (11) and a self-dispersible graphene used as a pigment (13) were manufactured as follows.

Manufacturing Example of Pigment (11): Self-Dispersible Carbon Black

First, 0.1 mmol/g (pigment) of p-aminobenzoic acid (manufactured by Tokyo Kasei Kogyo Co., Ltd.) and 25 mL of ion exchanged water were charged into a 300 mL flask, and then kept at 5° C. in an ice bath. 5 mL conc-hydrochloric acid was charged thereinto, a liquid in which 1.5 g (manufactured by Tokyo Kasei Kogyo Co., Ltd.) of sodium nitrite was dissolved in 5.4 mL of ion exchanged water was added dropwise, and then stirred for 2 hours while holding the temperature to give an adjustment liquid A.

The adjustment liquid A was charged into a carbon black slurry liquid obtained by charging 18 g of a carbon black pigment NIPEX170IQ (manufactured by Orion Engineered Carbons) and 200 mL of ion exchanged water into a vessel with 400 mL capacity (manufactured by AIMEX CO., Ltd.). Then, the mixture was stirred at room temperature for 48 hours (Number of rotations of 2,000 rpm). Thereafter, 15 mL of 5 mol/L-sodium hydroxide aqueous solution was charged to adjust the pH to 9.

Furthermore, impurities were removed (purification) from the reaction liquid using an ultrafilter (RP-2100, manufactured by Ira, [Filter; pencil type module SAP-0013, manufactured by Asahi Kasei Chemicals]). The purification was performed by repeating an operation of concentrating the carbon black pigment liquid to 20 ml by the ultrafilter (180 mL fractionated as filtrate), and thereafter charging 180 ml of ion-exchanged water for re-dilution 4 times, so that the electrical conductivity of the filtrate reached 50 µS/cm or less (45 µS/cm). Thereafter, the resultant substance was centrifuged at a number of revolutions of 5,000 rpm to remove coarse particles, and finally performing concentration adjustment, whereby a comparative pigment 1 having a solid concentration of 10.0% was obtained.

30 g of 0.1 mol/L sodium hydroxide solution was mixed with the solid, the resultant mixture was stirred for one day, and then the resultant mixture was centrifuged using a centrifugal separator (manufactured by Beckman Coulter) (80000 rpm, 60 minutes) to collect a supernatant. The liquid was subjected to back titration with the following potentiometric titration device, whereby the hydrophilic group amount on the pigment surface (Anion amount or number of moles of cation based on 1 g pigment) was quantitatively determined. As the potentiometric titration device, AT-510 (manufactured by KYOTO ELECTRONICS MANUFACTURING CO., LTD.) was used. As a result, the hydrophilic group amount was about 0.1 mmol/g.

Manufacturing Example of Pigment (13): Self-Dispersible Graphene

A self-dispersible graphene (13) was obtained in the same manner as in the manufacturing example of the pigment (11), except changing the carbon black pigment NIPEX170IQ (manufactured by Orion Engineered Carbons) to a graphene pigment xGNP-R10 (manufactured by XG Science). As a result of performing potentiometric titration, the hydrophilic group amount was about 0.005 mmol/g.

TABLE 1

| Pigment No. | Type | Manufacturer |
|---|---|---|
| 1 | C.I. Pigment Yellow 155 | Manufactured by Clariant |
| 2 | C.I. Pigment Yellow 180 | Manufactured by AK Scientific |
| 3 | C.I. Pigment Yellow 185 | Manufactured by BASF |
| 4 | C.I. Pigment Red 122 | Manufactured by Clariant |
| 5 | C.I. Pigment Red 255 | Manufactured by BASF |
| 6 | C.I. Pigment Red 150 | Manufactured by Fuji Pigment Co., Ltd. |
| 7 | C.I. Pigment Blue 15:3 | Manufactured by Dainichiseika Color & Chemicals Mfg. Co., Ltd. |
| 8 | C.I. Pigment Blue 16 | Manufactured by BASF |
| 9 | C.I. Pigment Blue 17:1 | Manufactured by BASF |
| 10 | Carbon black (NIPEX180IQ) | Manufactured by Orion Engineered Carbons |
| 11 | Self-dispersible carbon black | Described in Specification |
| 12 | Graphene (xGnP-C750) | Manufactured by XG Science |
| 13 | Self-dispersible graphene | Described in Specification |
| 14 | Expanded graphite (EXP-50SL) | Manufactured by Fuji Kokuen K.K. |
| 15 | Carbon nanotube (VGCF-H) | Manufactured by SHOWA DENKO K.K. |
| 16 | Nanodiamond (NanoAmando Hard Hydrogel) | Manufactured by NanoCarbon Research Institute Co., Ltd. |
| 17 | Graphite (CNP15) | Manufactured by Ito Kokuen Co., Ltd. |
| 18 | Graphene oxide | Manufactured by Graphenea |

Manufacturing Example 2 of Pigment Dispersion

A pigment dispersion was obtained by the same operation as that of Manufacturing Example 1 of Pigment Dispersion, except changing the dispersion medium (350 parts of toluene, 350 parts of ethyl acetate, and 300 parts of 2-butanone) to 1000 parts of water.

Manufacturing Example of Pigment Dispersion for Comparison

In Manufacturing Examples 1 and 2 of Pigment Dispersion described above, the manufacturing of a pigment dispersion for comparison was attempted changing the triazo compound to the dispersants described in Patent Documents 1 to 4. However, solidification occurred due to a viscosity increase, filtration and sample creation were not completed and the following evaluation was abandoned.

Evaluation of Pigment Dispersion

The following evaluation was performed using the pigment dispersions prepared in Manufacturing Example 1 of Pigment Dispersion (Examples 1 to 124). The same evaluation was similarly performed using the pigment dispersions which were similarly prepared except not using the triazo compound (Comparative Examples 1 to 15). The evaluation results are shown in Tables 2 to 6.

The following evaluation was performed using the pigment dispersions prepared in Manufacturing Example 2 of Pigment Dispersion (Examples 125 to 214). The same evaluation was similarly performed using the pigment dispersions which were similarly prepared except not using the triazo compound (Comparative Examples 6 to 33). The evaluation results are shown in Tables 7 to 9.

Evaluation
Sample Production

An image sample was produced by applying each pigment dispersion to a contrast ratio measurement paper by a bar coating method (Bar No. 10), and air-drying the pigment dispersion overnight.

Evaluation of Optical Density

Each image sample was measured for the optical density (OD (M)) of the magenta component under the conditions of Light source: D50 and Visual field: 20 using a spectrum photometer (Trade Name "SpectroLino", manufactured by Gretag Macbeth). When the pigment is further dispersed, the OD is further improved. Although the details are unclear, this is considered to be because the surface area of the pigment increases due to miniaturization of the pigment, so that the covering per unit area increases.

The OD improvement rate was used as the OD evaluation criteria. The OD improvement rate of each pigment when the triazo compound was added was calculated using the following expression and using the pigment dispersions (Comparative Examples 1 to 21) to which the triazo compound was not added as a reference.

$$OD\ improvement\ rate\ (\%) = \frac{OD\ of\ each\ pigment\ serving\ as\ OD\text{-}Ref\ after\ triazo\ addition}{OD\ of\ each\ pigment\ serving\ as\ Ref} \times 100$$

The evaluation criteria are as follows.
A: 10%≤OD improvement rate
B: 5%≤OD improvement rate <10%
C: 1%≤OD improvement rate <5%
D: OD improvement rate <1%

TABLE 2

| | Pigment Compound | | | |
|---|---|---|---|---|
| | Pigment No. | No. | Addition amount per 100 parts of pigment (part(s)) | OD Improvement Rate (%) | Rank |
| Ex. 1 | 1 | 1 | 5 | 9.2 | B |
| Ex. 2 | 1 | 2 | 5 | 4.4 | C |
| Ex. 3 | 1 | 5 | 5 | 3.1 | C |
| Ex. 4 | 1 | 9 | 5 | 2.3 | C |
| Ex. 5 | 1 | 10 | 5 | 2.8 | C |
| Ex. 6 | 1 | 18 | 5 | 9.6 | B |
| Ex. 7 | 1 | 19 | 5 | 6.8 | B |
| Ex. 8 | 1 | 37 | 5 | 10.2 | A |
| Ex. 9 | 1 | 38 | 5 | 12.5 | A |
| Ex. 10 | 1 | 44 | 5 | 11.6 | A |
| Ex. 11 | 1 | 45 | 5 | 12.2 | A |
| Ex. 12 | 1 | 47 | 5 | 11.8 | A |
| Ex. 13 | 1 | 48 | 5 | 10.9 | A |
| Ex. 14 | 1 | 55 | 5 | 11.3 | A |
| Ex. 15 | 1 | 56 | 5 | 12.8 | A |
| Ex. 16 | 1 | 90 | 5 | 5.9 | B |
| Ex. 17 | 2 | 1 | 5 | 9.3 | B |
| Ex. 18 | 2 | 18 | 5 | 9.5 | B |
| Ex. 19 | 2 | 38 | 5 | 12.7 | A |
| Ex. 20 | 2 | 45 | 5 | 12.4 | A |
| Ex. 21 | 2 | 48 | 5 | 11.2 | A |
| Ex. 22 | 2 | 56 | 5 | 12.4 | A |
| Ex. 23 | 3 | 1 | 5 | 9.1 | B |
| Ex. 24 | 3 | 18 | 5 | 9.2 | B |
| Ex. 25 | 3 | 38 | 5 | 12.1 | A |
| Ex. 26 | 3 | 45 | 5 | 12.3 | A |
| Ex. 27 | 3 | 48 | 5 | 10.8 | A |
| Ex. 28 | 3 | 56 | 5 | 12.3 | A |
| Ex. 29 | 4 | 1 | 5 | 9.6 | B |
| Ex. 30 | 4 | 18 | 5 | 9.5 | B |

TABLE 2-continued

|  | Pigment No. | Pigment Compound No. | Addition amount per 100 parts of pigment (part(s)) | OD Improvement Rate (%) | Rank |
|---|---|---|---|---|---|
| Ex. 31 | 4 | 38 | 5 | 12.8 | A |
| Ex. 32 | 4 | 45 | 5 | 12.4 | A |
| Ex. 33 | 4 | 48 | 5 | 11.5 | A |
| Ex. 34 | 4 | 56 | 5 | 12.7 | A |

TABLE 3

|  | Pigment No. | Pigment Compound No. | Addition amount per 100 parts of pigment (part(s)) | OD Improvement Rate (%) | Rank |
|---|---|---|---|---|---|
| Ex. 35 | 5 | 1 | 5 | 9.7 | B |
| Ex. 36 | 5 | 18 | 5 | 9.8 | B |
| Ex. 37 | 5 | 38 | 5 | 12.5 | A |
| Ex. 38 | 5 | 45 | 5 | 12.2 | A |
| Ex. 39 | 5 | 48 | 5 | 10.9 | A |
| Ex. 40 | 5 | 56 | 5 | 12.6 | A |
| Ex. 41 | 6 | 1 | 5 | 9.6 | B |
| Ex. 42 | 6 | 18 | 5 | 9.7 | B |
| Ex. 43 | 6 | 38 | 5 | 12.1 | A |
| Ex. 44 | 6 | 45 | 5 | 11.7 | A |
| Ex. 45 | 6 | 48 | 5 | 10.7 | A |
| Ex. 46 | 6 | 56 | 5 | 12.4 | A |
| Ex. 47 | 7 | 1 | 1 | 6.7 | B |
| Ex. 48 | 7 | 1 | 2 | 8.4 | B |
| Ex. 49 | 7 | 1 | 5 | 10.1 | A |
| Ex. 50 | 7 | 1 | 10 | 10.4 | A |
| Ex. 51 | 7 | 1 | 20 | 9.9 | B |
| Ex. 52 | 7 | 18 | 1 | 5.9 | B |
| Ex. 53 | 7 | 18 | 2 | 7.7 | B |
| Ex. 54 | 7 | 18 | 5 | 9.9 | B |
| Ex. 55 | 7 | 18 | 10 | 10.2 | A |
| Ex. 56 | 7 | 18 | 20 | 9.8 | B |
| Ex. 57 | 7 | 38 | 1 | 7.3 | B |
| Ex. 58 | 7 | 38 | 2 | 10.1 | A |
| Ex. 59 | 7 | 38 | 5 | 12.7 | A |
| Ex. 60 | 7 | 38 | 10 | 12.9 | A |
| Ex. 61 | 7 | 38 | 20 | 11.4 | A |
| Ex. 62 | 7 | 45 | 1 | 7.1 | B |
| Ex. 63 | 7 | 45 | 2 | 9.9 | B |
| Ex. 64 | 7 | 45 | 5 | 12.1 | A |
| Ex. 65 | 7 | 45 | 10 | 12.2 | A |
| Ex. 66 | 7 | 45 | 20 | 10.2 | A |

TABLE 4

|  | Pigment No. | Pigment Compound No. | Addition amount per 100 parts of pigment (part(s)) | OD Improvement Rate (%) | Rank |
|---|---|---|---|---|---|
| Ex. 67 | 7 | 48 | 1 | 7.7 | B |
| Ex. 68 | 7 | 48 | 2 | 9.7 | B |
| Ex. 69 | 7 | 48 | 5 | 11.8 | A |
| Ex. 70 | 7 | 48 | 10 | 11.8 | A |
| Ex. 71 | 7 | 48 | 20 | 10.9 | A |
| Ex. 72 | 7 | 56 | 1 | 8.9 | B |
| Ex. 73 | 7 | 56 | 2 | 10.2 | A |
| Ex. 74 | 7 | 56 | 5 | 12.9 | A |
| Ex. 75 | 7 | 56 | 10 | 12.8 | A |
| Ex. 76 | 7 | 56 | 20 | 12.1 | A |
| Ex. 77 | 8 | 1 | 5 | 9.8 | B |
| Ex. 78 | 8 | 18 | 5 | 9.9 | B |
| Ex. 79 | 8 | 38 | 5 | 12.7 | A |
| Ex. 80 | 8 | 45 | 5 | 12.1 | A |
| Ex. 81 | 8 | 48 | 5 | 11.8 | A |

TABLE 4-continued

|  | Pigment No. | Pigment Compound No. | Addition amount per 100 parts of pigment (part(s)) | OD Improvement Rate (%) | Rank |
|---|---|---|---|---|---|
| Ex. 82 | 8 | 56 | 5 | 12.9 | A |
| Ex. 83 | 9 | 1 | 5 | 9.6 | B |
| Ex. 84 | 9 | 18 | 5 | 9.7 | B |
| Ex. 85 | 9 | 38 | 5 | 12.8 | A |
| Ex. 86 | 9 | 45 | 5 | 12.2 | A |
| Ex. 87 | 9 | 48 | 5 | 11.6 | A |
| Ex. 88 | 9 | 56 | 5 | 12.9 | A |
| Ex. 89 | 10 | 1 | 5 | 9.9 | B |
| Ex. 90 | 10 | 18 | 5 | 9.8 | B |
| Ex. 91 | 10 | 38 | 5 | 12.7 | A |
| Ex. 92 | 10 | 45 | 5 | 12.3 | A |
| Ex. 93 | 10 | 48 | 5 | 11.8 | A |
| Ex. 94 | 10 | 56 | 5 | 12.8 | A |
| Ex. 95 | 12 | 1 | 5 | 8.2 | B |
| Ex. 96 | 12 | 18 | 5 | 7.6 | B |
| Ex. 97 | 12 | 38 | 5 | 10.1 | A |
| Ex. 98 | 12 | 45 | 5 | 10.9 | A |
| Ex. 99 | 12 | 48 | 5 | 11.6 | A |
| Ex. 100 | 12 | 56 | 5 | 11.7 | A |

TABLE 5

|  | Pigment No. | Pigment Compound No. | Addition amount per 100 parts of pigment (part(s)) | OD Improvement Rate (%) | Rank |
|---|---|---|---|---|---|
| Ex. 101 | 14 | 1 | 5 | 7.8 | B |
| Ex. 102 | 14 | 18 | 5 | 7.1 | B |
| Ex. 103 | 14 | 38 | 5 | 9.8 | B |
| Ex. 104 | 14 | 45 | 5 | 9.9 | B |
| Ex. 105 | 14 | 48 | 5 | 10.2 | A |
| Ex. 106 | 14 | 56 | 5 | 10.9 | A |
| Ex. 107 | 15 | 1 | 5 | 7.5 | B |
| Ex. 108 | 15 | 18 | 5 | 6.9 | B |
| Ex. 109 | 15 | 38 | 5 | 9.9 | B |
| Ex. 110 | 15 | 45 | 5 | 10.1 | A |
| Ex. 111 | 15 | 48 | 5 | 10.5 | A |
| Ex. 112 | 15 | 56 | 5 | 10.9 | A |
| Ex. 113 | 16 | 1 | 5 | 7.2 | B |
| Ex. 114 | 16 | 18 | 5 | 6.7 | B |
| Ex. 115 | 16 | 38 | 5 | 8.8 | B |
| Ex. 116 | 16 | 45 | 5 | 9.1 | B |
| Ex. 117 | 16 | 48 | 5 | 10.1 | A |
| Ex. 118 | 16 | 56 | 5 | 10.4 | A |
| Ex. 119 | 17 | 1 | 5 | 6.9 | B |
| Ex. 120 | 17 | 18 | 5 | 6.5 | B |
| Ex. 121 | 17 | 38 | 5 | 8.2 | B |
| Ex. 122 | 17 | 45 | 5 | 8.9 | B |
| Ex. 123 | 17 | 48 | 5 | 9.7 | B |
| Ex. 124 | 17 | 56 | 5 | 9.9 | B |

TABLE 6

|  | Pigment No. | Pigment Compound No. | Addition amount per 100 parts of pigment (part(s)) | OD Improvement Rate (%) | Rank |
|---|---|---|---|---|---|
| Comp. Ex. 1 | 1 | — | — | — | D |
| Comp. Ex. 2 | 2 | — | — | — | D |
| Comp. Ex. 3 | 3 | — | — | — | D |
| Comp. Ex. 4 | 4 | — | — | — | D |
| Comp. Ex. 5 | 5 | — | — | — | D |
| Comp. Ex. 6 | 6 | — | — | — | D |
| Comp. Ex. 7 | 7 | — | — | — | D |
| Comp. Ex. 8 | 8 | — | — | — | D |

TABLE 6-continued

| | | Pigment Compound | | |
|---|---|---|---|---|
| Pigment No. | No. | Addition amount per 100 parts of pigment (part(s)) | OD Improvement Rate (%) | Rank |
| Comp. Ex. 9 | 9 | — | — | D |
| Comp. Ex. 10 | 10 | — | — | D |
| Comp. Ex. 11 | 12 | — | — | D |
| Comp. Ex. 12 | 14 | — | — | D |
| Comp. Ex. 13 | 15 | — | — | D |
| Comp. Ex. 14 | 16 | — | — | D |
| Comp. Ex. 15 | 17 | — | — | D |

TABLE 7

| | | Pigment Compound | | |
|---|---|---|---|---|
| Pigment No. | No. | Addition amount per 100 parts of pigment (part(s)) | OD Improvement Rate (%) | Rank |
| Ex. 125 | 1 | 6 | 5 | 2.8 | C |
| Ex. 126 | 1 | 25 | 5 | 11.5 | A |
| Ex. 127 | 1 | 27 | 5 | 8.6 | B |
| Ex. 128 | 1 | 28 | 5 | 7.7 | B |
| Ex. 129 | 1 | 30 | 5 | 11.1 | A |
| Ex. 130 | 1 | 31 | 5 | 10.9 | A |
| Ex. 131 | 2 | 25 | 5 | 11.7 | A |
| Ex. 132 | 2 | 27 | 5 | 8.8 | B |
| Ex. 133 | 2 | 30 | 5 | 11.5 | A |
| Ex. 134 | 2 | 31 | 5 | 11.1 | A |
| Ex. 135 | 3 | 25 | 5 | 11.9 | A |
| Ex. 136 | 3 | 27 | 5 | 9.1 | B |
| Ex. 137 | 3 | 30 | 5 | 11.4 | A |
| Ex. 138 | 3 | 31 | 5 | 10.9 | A |
| Ex. 139 | 4 | 25 | 5 | 12.2 | A |
| Ex. 140 | 4 | 27 | 5 | 9.4 | B |
| Ex. 141 | 4 | 30 | 5 | 11.2 | A |
| Ex. 142 | 4 | 31 | 5 | 10.8 | A |
| Ex. 143 | 5 | 25 | 5 | 11.8 | A |
| Ex. 144 | 5 | 27 | 5 | 9.1 | B |
| Ex. 145 | 5 | 30 | 5 | 11.3 | A |
| Ex. 146 | 5 | 31 | 5 | 10.7 | A |
| Ex. 147 | 6 | 25 | 5 | 11.6 | A |
| Ex. 148 | 6 | 27 | 5 | 8.9 | B |
| Ex. 149 | 6 | 30 | 5 | 10.3 | A |
| Ex. 150 | 6 | 31 | 5 | 10.8 | A |
| Ex. 151 | 7 | 25 | 1 | 7.8 | B |
| Ex. 152 | 7 | 25 | 2 | 10.1 | A |
| Ex. 153 | 7 | 25 | 5 | 11.5 | A |
| Ex. 154 | 7 | 25 | 10 | 11.9 | A |
| Ex. 155 | 7 | 25 | 20 | 11.2 | A |
| Ex. 156 | 7 | 27 | 1 | 5.7 | B |
| Ex. 157 | 7 | 27 | 2 | 7.9 | B |
| Ex. 158 | 7 | 27 | 5 | 8.3 | B |
| Ex. 159 | 7 | 27 | 10 | 8.9 | B |
| Ex. 160 | 7 | 27 | 20 | 8.1 | B |

TABLE 8

| | | Pigment Compound | | |
|---|---|---|---|---|
| Pigment No. | No. | Addition amount per 100 parts of pigment (part(s)) | OD Improvement Rate (%) | Rank |
| Ex. 161 | 7 | 30 | 1 | 6.3 | B |
| Ex. 162 | 7 | 30 | 2 | 8.2 | B |
| Ex. 163 | 7 | 30 | 5 | 8.9 | B |
| Ex. 164 | 7 | 30 | 10 | 9.4 | B |
| Ex. 165 | 7 | 30 | 20 | 8.7 | B |
| Ex. 166 | 7 | 31 | 1 | 7.1 | B |
| Ex. 167 | 7 | 31 | 2 | 9.9 | B |
| Ex. 168 | 7 | 31 | 5 | 11.1 | A |
| Ex. 169 | 7 | 31 | 10 | 11.4 | A |
| Ex. 170 | 7 | 31 | 20 | 10.9 | A |
| Ex. 171 | 8 | 25 | 5 | 12.1 | A |
| Ex. 172 | 8 | 27 | 5 | 8.1 | B |
| Ex. 173 | 8 | 30 | 5 | 9.3 | B |
| Ex. 174 | 8 | 31 | 5 | 10.7 | A |
| Ex. 175 | 9 | 25 | 5 | 11.9 | A |
| Ex. 176 | 9 | 27 | 5 | 10.2 | A |
| Ex. 177 | 9 | 30 | 5 | 9.2 | B |
| Ex. 178 | 9 | 31 | 5 | 11.4 | A |
| Ex. 179 | 10 | 25 | 5 | 11.7 | A |
| Ex. 180 | 10 | 27 | 5 | 8.9 | B |
| Ex. 181 | 10 | 30 | 5 | 10.6 | A |
| Ex. 182 | 10 | 31 | 5 | 9.8 | B |
| Ex. 183 | 11 | 25 | 5 | 11.8 | A |
| Ex. 184 | 11 | 27 | 5 | 9.2 | B |
| Ex. 185 | 11 | 30 | 5 | 10.1 | A |
| Ex. 186 | 11 | 31 | 5 | 11.1 | A |
| Ex. 187 | 12 | 25 | 5 | 8.7 | B |
| Ex. 188 | 12 | 27 | 5 | 6.7 | B |
| Ex. 189 | 12 | 30 | 5 | 8.2 | B |
| Ex. 190 | 12 | 31 | 5 | 8.3 | B |
| Ex. 191 | 13 | 25 | 5 | 11.3 | A |
| Ex. 192 | 13 | 27 | 5 | 9.4 | B |
| Ex. 193 | 13 | 30 | 5 | 10.5 | A |
| Ex. 194 | 13 | 31 | 5 | 10.7 | A |
| Ex. 195 | 14 | 25 | 5 | 9.6 | B |
| Ex. 196 | 14 | 27 | 5 | 8.4 | B |
| Ex. 197 | 14 | 30 | 5 | 9.2 | B |
| Ex. 198 | 14 | 31 | 5 | 9.4 | B |

TABLE 9

| | | Pigment Compound | | |
|---|---|---|---|---|
| Pigment No. | No. | Addition amount per 100 parts of pigment (part(s)) | OD Improvement Rate (%) | Rank |
| Ex. 199 | 15 | 25 | 5 | 10.8 | A |
| Ex. 200 | 15 | 27 | 5 | 9.5 | B |
| Ex. 201 | 15 | 30 | 5 | 10.6 | A |
| Ex. 202 | 15 | 31 | 5 | 10.5 | A |
| Ex. 203 | 16 | 25 | 5 | 10.2 | A |
| Ex. 204 | 16 | 27 | 5 | 8.9 | B |
| Ex. 205 | 16 | 30 | 5 | 10.2 | A |
| Ex. 206 | 16 | 31 | 5 | 10.1 | A |
| Ex. 207 | 17 | 25 | 5 | 7.9 | B |
| Ex. 208 | 17 | 27 | 5 | 5.7 | B |
| Ex. 209 | 17 | 30 | 5 | 7.3 | B |
| Ex. 210 | 17 | 31 | 5 | 7.2 | B |
| Ex. 211 | 18 | 25 | 5 | 10.4 | A |
| Ex. 212 | 18 | 27 | 5 | 8.8 | B |
| Ex. 213 | 18 | 30 | 5 | 10.2 | A |
| Ex. 214 | 18 | 31 | 5 | 10.1 | A |
| Comp. Ex. 16 | 1 | — | — | — | D |
| Comp. Ex. 17 | 2 | — | — | — | D |
| Comp. Ex. 18 | 3 | — | — | — | D |
| Comp. Ex. 19 | 4 | — | — | — | D |
| Comp. Ex. 20 | 5 | — | — | — | D |
| Comp. Ex. 21 | 6 | — | — | — | D |
| Comp. Ex. 22 | 7 | — | — | — | D |
| Comp. Ex. 23 | 8 | — | — | — | D |
| Comp. Ex. 24 | 9 | — | — | — | D |
| Comp. Ex. 25 | 10 | — | — | — | D |
| Comp. Ex. 26 | 11 | — | — | — | D |
| Comp. Ex. 27 | 12 | — | — | — | D |
| Comp. Ex. 28 | 13 | — | — | — | D |
| Comp. Ex. 29 | 14 | — | — | — | D |
| Comp. Ex. 30 | 15 | — | — | — | D |
| Comp. Ex. 31 | 16 | — | — | — | D |

TABLE 9-continued

| | | Pigment Compound | | |
|---|---|---|---|---|
| | Pigment No. | No. | Addition amount per 100 parts of pigment (part(s)) | OD Improvement Rate (%) | Rank |
| Comp. Ex. 32 | 17 | — | — | — | D |
| Comp. Ex. 33 | 18 | — | — | — | D |

Manufacturing of Toner

Each toner of the present disclosure and each comparative toner were manufactured by methods described below.

Example 301

A mixture of 10 parts of the pigment (4), 0.5 part of the compound (38), and 120 parts of styrene was dispersed for 3 hours by an attritor (manufactured by Mitsui Mining Co., Ltd.) to obtain a pigment dispersion (301).

Into a 2 L four-necked flask having a high-speed stirring device T.K. homomixer (manufactured by PRIMIX Corporation), 710 parts of ion exchanged water and 450 parts of 0.1 mol/L-trisodium phosphate aqueous solution were added, the number of rotations was adjusted to 12,000 rpm, and then the mixture was warmed to 60° C. 68 parts of 1.0 mol/L-calcium chloride aqueous solutions was gradually added thereto to prepare an aqueous dispersion medium containing minute poorly water soluble dispersion stabilizer calcium phosphate.
Pigment dispersion (301) 130.5 parts
Styrene monomer 46.0 parts
n-butyl acrylate monomer 34.0 parts
Aluminum salicylate compound 2.0 parts
(BONTRON E-88, manufactured by Orient Chemical Industries Co., Ltd.)
Polar resin 10.0 parts
(Polycondensate of propylene oxide-modified bisphenol A and isophthalic acid, Tg=65° C., Mw=10,000, Mn=6,000)
Ester wax 25.0 parts
(Peak temperature of maximum endothermic peak in DSC measurement=70° C., Mn=704)
Divinylbenzene monomer 0.10 part The formula above was warmed to 60° C., and then uniformly dissolved•dispersed at 5,000 rpm using a T.K. homomixer. 10 parts of 2,2'-azobis (2,4-dimethylvaleronitrile) which is a polymerization initiator was dissolved therein to prepare a polymerizable monomer composition.

The polymerizable monomer composition above was charged into the aqueous dispersion medium above, and then granulated for 15 minutes while maintaining the number of rotations of 12,000 rpm. Thereafter, a stirring blade on the T.K. homomixer was changed to a propeller stirring blade, the polymerization was continued for 5 hours at a liquid temperature of 60° C., the liquid temperature was increased to 80° C., and then the polymerization was continued for 8 hours. After the end of the polymerization reaction, a residual monomer was distilled off at 80° C. under reduced pressure, and then the liquid temperature was reduced to 30° C. to give a polymer fine particle dispersion.

Next, the polymer fine particle dispersion was transferred to a cleaning vessel, dilute hydrochloric acid was added under stirring to adjust the pH to 1.5, and then stirred for 2 hours. The resultant substance was subjected to solid-liquid separation with a filter to give polymer fine particles. The redispersion in water and the solid-liquid separation of the polymer fine particles were repeatedly performed until a compound of phosphoric acid and calcium containing calcium phosphate was sufficiently removed. Thereafter, the polymer fine particles which were finally solid-liquid separated were sufficiently dried with a drier to give toner base particles (1).

To 100 parts of the obtained toner base particles (1), the following fine powder was dry-mixed for 5 minutes using a Henschel mixer (manufactured by NIPPON COKE &. ENGINEERING CO., LTD.) to give a toner (301).
Hydrophobic silica fine powder surface-treated with hexamethyldisilazane (Number average particle diameter of primary particles of 7 nm) 1.00 part
Rutile type titanium oxide fine powder (Number average particle diameter of primary particles of 45 nm) 0.15 part
Rutile type titanium oxide fine powder (Number average particle diameter of primary particles of 200 nm) 0.50 part Examples 302 to 304

A toner (302) was similarly obtained, except changing 0.5 part of the compound (38) to 0.5 part of the compound (45) in Example 301,
a toner (303) was similarly obtained, except changing 0.5 part of the compound (38) to 0.5 part of the compound (55) in Example 301, and
a toner (304) was similarly obtained, except changing 0.5 part of the compound (38) to 0.5 part of the compound (56) in Example 301.

Examples 305 to 308

A toner (305) to a toner (308) were obtained in the same manner as in each Example, except changing 10 parts of the pigment (4) to 10 parts of the pigment (6) in Examples 301 to 304.

Examples 319 to 312

A toner (309) to a toner (312) were obtained in the same manner as in each Example, except changing 10 parts of the pigment (4) to 10 parts of the pigment (1) in Examples 301 to 304.

Examples 313 to 316

A toner (313) to a toner (316) were obtained in the same manner as in each Example, except changing 10 parts of the pigment (4) to 10 parts of the pigment (3) in Examples 301 to 304.

Examples 317 to 320

A toner (317) to a toner (320) were obtained in the same manner as in each Example, except changing 10 parts of the pigment (4) to 10 parts of the pigment (7) in Examples 301 to 304.

Examples 321 to 324

A toner (321) to a toner (324) were obtained in the same manner as in each Example, except changing 10 parts of the pigment (4) to 10 parts of the pigment (10) in Examples 301 to 304.

Comparative Examples 101 to 106

A comparative toner (101) to a comparative toner (106) were obtained in the same manner as in each Example, except not adding the compound (38) in Examples 301, 305, 309, 313, 317, and 321.

Image Sample Evaluation Using Toner

Next, image samples were output using the toner (301) to the toner (324) and the comparative toner (101) to the comparative toner (106), and then the image characteristics described later were compared and evaluated. For the comparison of the image characteristics, a sheet passing durability test using a converted machine of LBP-5300 (manufactured by CANON KABUSHIKI KAISHA) as an image forming apparatus (hereinafter also referred to as LBP) was performed. As the details of the conversion, a development blade in a process cartridge (hereinafter also referred to as CRG) was replaced by a 8 μm thick SUS blade.

Moreover, the conversion was performed so that a blade bias of −200 V can be applied to a development bias to be applied to a developing roller which is a tonner carrier.

For the evaluation, the CRG into which each toner was individually charged was prepared for each evaluation item. Then, each CRG into which each toner was charged was set on the LBP, and then evaluated for each evaluation item described below.

Evaluation of Optical Density of Toner

A solid image sample of each toner was measured for the optical density (OD (M)) of the magenta component under the conditions of Light source: D50 and Visual field: 2° using a spectrum photometer (Trade Name "SpectroLino", manufactured by Gretag Macbeth).

The OD improvement rate was used as the OD evaluation criteria. The OD improvement rate of each toner when the triazo compound was added was calculated using the following expression using the comparative toner 101 to the comparative toner 106 to which the triazo compound was not added as a reference.

$$\text{Toner } OD \text{ improvement rate } (\%) = \frac{\text{triazo-added tonor solid image } OD\text{-}Ref}{\text{Toner solid image } OD \text{ serving as } Ref} \times 100$$

The evaluation criteria are as follows. The results are shown in Table 10.
A: 10%≤Toner OD improvement rate
B: 5%≤Toner OD improvement rate <10%
C: 1%≤Toner OD improvement rate <5%
D: Toner OD improvement rate <1%

TABLE 10

| Toner No. | Pigment No. | Pigment Compound | OD Improvement Rate (%) | Rank |
|---|---|---|---|---|
| Ex. 301 | Toner 301 | 4 | 38 | 9.2 | B |
| Ex. 302 | Toner 302 | 4 | 45 | 9.6 | B |
| Ex. 303 | Toner 303 | 4 | 55 | 10.3 | A |
| Ex. 304 | Toner 304 | 4 | 56 | 11.2 | A |
| Ex. 305 | Toner 305 | 6 | 38 | 9.1 | B |
| Ex. 306 | Toner 306 | 6 | 45 | 8.9 | B |
| Ex. 307 | Toner 307 | 6 | 55 | 9.6 | B |
| Ex. 308 | Toner 308 | 6 | 56 | 10.6 | A |
| Ex. 309 | Toner 309 | 1 | 38 | 9.4 | B |
| Ex. 310 | Toner 310 | 1 | 45 | 9.6 | B |
| Ex. 311 | Toner 311 | 1 | 55 | 10.1 | A |
| Ex. 312 | Toner 312 | 1 | 56 | 11.3 | A |
| Ex. 313 | Toner 313 | 3 | 38 | 9.6 | B |
| Ex. 314 | Toner 314 | 3 | 45 | 9.1 | B |
| Ex. 315 | Toner 315 | 3 | 55 | 10.2 | A |
| Ex. 316 | Toner 316 | 3 | 56 | 11.4 | A |
| Ex. 317 | Toner 317 | 7 | 38 | 9.8 | B |
| Ex. 318 | Toner 318 | 7 | 45 | 8.9 | B |
| Ex. 319 | Toner 319 | 7 | 55 | 10.1 | A |
| Ex. 320 | Toner 320 | 7 | 56 | 11.2 | A |
| Ex. 321 | Toner 321 | 10 | 38 | 10.4 | A |
| Ex. 322 | Toner 322 | 10 | 45 | 9.4 | B |
| Ex. 323 | Toner 323 | 10 | 55 | 10.6 | A |
| Ex. 324 | Toner 324 | 10 | 56 | 11.8 | A |
| Comp. Ex. 101 | Comparative Toner 101 | 4 | — | — | D |
| Comp. Ex. 102 | Comparative Toner 102 | 6 | — | — | D |
| Comp. Ex. 103 | Comparative Toner 103 | 1 | — | — | D |
| Comp. Ex. 104 | Comparative Toner 104 | 3 | — | — | D |
| Comp. Ex. 105 | Comparative Toner 105 | 7 | — | — | D |
| Comp. Ex. 106 | Comparative Toner 106 | 10 | — | — | D |

Aqueous Ink

Each aqueous ink of the present disclosure and each comparative aqueous ink were manufactured by methods described below.

Example 401

The pH of the pigment dispersion prepared in Example 130 was adjusted to 9 by a 0.5 mol/L-sodium hydroxide aqueous solution, and then an aqueous ink precursor (401) was obtained.

Aqueous ink precursor (401): 30 parts
Glycerol: 13 parts
Triethylene glycol: 7 parts
Nonionic surfactant (Trade Name: Acetylenol E100, manufactured by Kawaken Fine Chemicals Co., Ltd.): 0.2 part
Ion exchanged water: 49.8 parts The substances above were sufficiently stirred so that the pigment concentration in an ink was 3 parts, and then filtered under pressure using a membrane filter having a pore size of 1.2 μm (Trade Name "HDCII filter", manufactured by Pall Corporation) to prepare an aqueous ink (401).

Example 402

An aqueous ink (402) was similarly obtained, except changing the used pigment dispersion to one prepared in Example 139 in Example 401.

Examples 403 to 407

An aqueous ink (403) to an aqueous ink (407) were similarly obtained, except changing the used pigment dispersion to those prepared in Examples 151 to 155 in Example 401.

Example 408

An aqueous ink (408) was similarly obtained, except changing the used pigment dispersion to one prepared in Example 181 and changing the 0.5 mol/L-sodium hydroxide aqueous solution to a 0.5 mol/L-potassium hydroxide aqueous solution in Example 401.

Examples 409 to 412

An aqueous ink (409) to an aqueous ink (412) were similarly obtained, except changing the used pigment dispersion to those prepared in Examples 186, 190, 194, and 214 in Example 408.

Comparative Examples 201 to 203

A comparative aqueous ink (201) to a comparative aqueous ink (203) were similarly obtained, except changing the used pigment dispersion to the pigment dispersions prepared in Comparative Examples 16, 19, and 22 in Example 401.

Comparative Examples 204 to 208

A comparative aqueous ink (204) to a comparative aqueous ink (208) were similarly obtained, except changing the used pigment dispersion to the pigment dispersions prepared in Comparative Examples 25, 26, 27, 28, and 33 in Example 408.

Comparative Example 209

A comparative aqueous ink (209) was similarly obtained, except changing the used pigment dispersion to the pigment dispersion prepared in Comparative Example 22 and changing the 0.5 mol/L-sodium hydroxide aqueous solution to a 0.5 mol/L-calcium hydroxide aqueous solution in Example 401.

Comparative Example 210

A comparative aqueous ink (210) was similarly obtained, except changing the used pigment dispersion to the pigment dispersions prepared in Comparative Example 25 in Comparative Example 209.

Evaluation of Storage Stability of Aqueous Ink

The average particle diameter of each obtained aqueous ink was measured. Subsequently, each aqueous ink was placed in an airtight container, and then stored for two weeks in a thermostat having a temperature of 70° C. Thereafter, the temperature was returned to normal temperature, and then the average particle diameter after the storage was measured. For the measurement of the average particle diameter, a Fiber-Optics Particle Analyzer (Trade Name: FPAR-1000, manufactured by Otsuka Electronics Co., Ltd.) which is one of the light scattering particle size distribution meters was used, and the 50% cumulative particle diameter [D50] in the particle diameter distribution on a volume basis was measured. As the actual measured value, the average value of the measured values obtained by performing the measurement 3 times was adopted. The measuring time was set to 120 seconds and the refractive index was set to 1.8 (carbon material) and 1.6 (organic pigment).

The rate of change of the average particle diameters before and after the storage was calculated using the following expression.

$$\text{Rate of charge of average particle diameter (\%)} = \frac{\text{Average particle diameter after storage} - \text{Average particle diameter before storage}}{\text{Average particle diameter before storage}} \times 100$$

From the rate of change of the average particle diameters before and after the storage, the storage stability was evaluated in accordance with the evaluation criteria described below. The evaluation results are shown in Table 11.

A: The rate of change of the average particle diameters is 10% or less.
B: The rate of change of the average particle diameters is more than 10% and 15% or less.
C: The rate of change of the average particle diameters is more than 15% and 20% or less.
D: The rate of change of the average particle diameters is more than 20%.

TABLE 11

| | Used Pigment Dispersion | Particle Diameter Change Rate (%) | Rank |
|---|---|---|---|
| Ex. 401 | Pigment Dispersion prepared in Ex. 130 | 11.6 | B |
| Ex. 402 | Pigment Dispersion prepared in Ex. 139 | 8.7 | A |
| Ex. 403 | Pigment Dispersion prepared in Ex. 151 | 14.9 | B |
| Ex. 404 | Pigment Dispersion prepared in Ex. 152 | 10.3 | B |
| Ex. 405 | Pigment Dispersion prepared in Ex. 153 | 6.2 | A |
| Ex. 406 | Pigment Dispersion prepared in Ex. 154 | 4.4 | A |
| Ex. 407 | Pigment Dispersion prepared in Ex. 155 | 6.8 | A |
| Ex. 408 | Pigment Dispersion prepared in Ex. 181 | 7.3 | A |
| Ex. 409 | Pigment Dispersion prepared in Ex. 186 | 9.3 | A |
| Ex. 410 | Pigment Dispersion prepared in Ex. 190 | 18.1 | C |
| Ex. 411 | Pigment Dispersion prepared in Ex. 194 | 17.4 | C |
| Ex. 412 | Pigment Dispersion prepared in Ex. 214 | 16.8 | C |
| Comp. Ex. 201 | Pigment Dispersion prepared in Comp. Ex. 16 | 313 | D |
| Comp. Ex. 202 | Pigment Dispersion prepared in Comp. Ex. 19 | 33.8 | D |
| Comp. Ex. 203 | Pigment Dispersion prepared in Comp. Ex. 22 | 32.6 | D |
| Comp. Ex. 204 | Pigment Dispersion prepared in Comp. Ex. 25 | 34.6 | D |
| Comp. Ex. 205 | Pigment Dispersion prepared in Comp. Ex. 26 | 29.9 | D |
| Comp. Ex. 206 | Pigment Dispersion prepared in Comp. Ex. 27 | 47.7 | D |
| Comp. Ex. 207 | Pigment Dispersion prepared in Comp. Ex. 28 | 45.3 | D |
| Comp. Ex. 208 | Pigment Dispersion prepared in Comp. Ex. 33 | 44.8 | D |
| Comp. Ex. 209 | Pigment Dispersion prepared in Comp. Ex. 22 | 60.5 | D |
| Comp. Ex. 210 | Pigment Dispersion prepared in Comp. Ex. 25 | 67.8 | D |

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-061994 filed Mar. 27, 2017 which is hereby incorporated by reference herein in its entirety.

What is claimed is:

1. A pigment dispersion comprising:
a dispersion medium;
an organic pigment; and
a compound having a structure represented by a following formula (1), wherein
an amount of the compound is 1 to 100 parts by mass based on 100 parts by mass of the organic pigment,

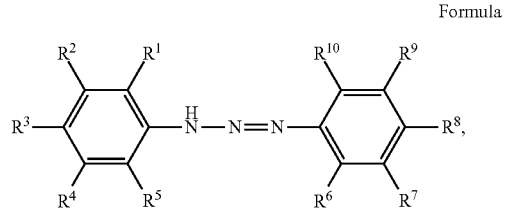

Formula (1)

wherein, in Formula (1), $R^1$ to $R^{10}$ each independently represent a hydrogen atom, an unsubstituted alkyl group, an alkyl group substituted with a carboxy group, an alkyl group substituted with a sulfonic acid group or a sulfonic acid alkali metal salt, an alkyl group substituted with a phosphate group or a phosphoric acid alkali metal salt, an alkyl group substituted with a nitro group, an alkyl group substituted with an aryl group, an alkenyl group, an alkynyl group, an alkoxycarbonyl group, an alkenyloxycarbonyl group, an aryloxycarbonyl group, an unsubstituted aryl group, an aryl group substituted with a carboxy group, an aryl group substituted with a nitro group, an aryl group substituted with a halogen group, an amide group, an acylamino group, a nitro group, a cyano group, an alkoxy group, a halogen group, an amino group, an alkylthio group, an acyl group, a carboxy group, a hydroxyl group, a sulfonic acid group, a sulfonic acid alkali metal salt, a phosphate group, a phosphoric acid alkali metal salt, or $R^1$ to $R^5$ or $R^6$ to $R^{10}$ are optionally bonded to each other to form a ring, $R^1$ to $R^{10}$ subjected to the formation of the ring optionally represent an atomic group required for the formation of the ring, and the formed ring optionally has a substituent.

2. A method for manufacturing a toner comprising:
a step of dispersing an organic pigment and a compound having a structure represented by Formula (1) in a polymerizable monomer to prepare a polymerizable monomer composition;
a granulation step of adding the polymerizable monomer composition to an aqueous medium to form particles of the polymerizable monomer composition in the aqueous medium; and
a polymerization step of polymerizing the polymerizable monomer contained in the particles of the polymerizable monomer composition, wherein
an amount of the compound is 1 to 100 parts by mass based on 100 parts by mass of the organic pigment, Formula (1)

wherein, in Formula (1), $R^1$ to $R^{10}$ each independently represent a hydrogen atom, an unsubstituted alkyl group, an alkyl group substituted with a carboxy group, an alkyl group substituted with a sulfonic acid group or a sulfonic acid alkali metal salt, an alkyl group substituted with a phosphate group or a phosphoric acid alkali metal salt, an alkyl group substituted with a nitro group, an alkyl group substituted with an aryl group, an alkenyl group, an alkynyl group, an alkoxycarbonyl group, an alkenyloxycarbonyl group, an aryloxycarbonyl group, an unsubstituted aryl group, an aryl group substituted with a carboxy group, an aryl group substituted with a nitro group, an aryl group substituted with a halogen group, an amide group, an acylamino group, a nitro group, a cyano group, an alkoxy group, a halogen group, an amino group, an alkylthio group, an acyl group, a carboxy group, a hydroxyl group, a sulfonic acid group or a sulfonic acid alkali metal salt, or a phosphate group or a phosphoric acid alkali metal salt, or $R^1$ to $R^5$ or $R^6$ to $R^{10}$ are optionally bonded to each other to form a ring, $R^1$ to $R^{10}$ subjected to the formation of the ring optionally represent an atomic group required for the formation of the ring, and the formed ring optionally has a substituent.

3. An aqueous ink comprising:
an aqueous medium;
an organic pigment; and
a compound having a structure represented by a following formula (1), wherein
an amount of the compound is 1 to 100 parts by mass based on 100 parts by mass of the organic pigment, Formula (1)

wherein, in Formula (1), $R^1$ to $R^{10}$ each independently represent a hydrogen atom, an unsubstituted alkyl group, an alkyl group substituted with a carboxy group, an alkyl group substituted with a sulfonic acid group or a sulfonic acid alkali metal salt, an alkyl group substituted with a phosphate group or a phosphoric acid alkali metal salt, an alkyl group substituted with a nitro group, an alkyl group substituted with an aryl group, an alkenyl group, an alkynyl group, an alkoxycarbonyl group, an alkenyloxycarbonyl group, an aryloxycarbonyl group, an unsubstituted aryl group, an aryl group substituted with a carboxy group, an aryl group substituted with a nitro group, an aryl group substituted with a halogen group, an amide group, an acylamino group, a nitro group, a cyano group, an alkoxy group, a halogen group, an amino group, an alkylthio group, an acyl group, a carboxy group, a hydroxyl group, a sulfonic acid group or a sulfonic acid alkali metal salt, or a phosphate group or a phosphoric acid alkali metal salt, or $R^1$ to $R^5$ or $R^6$ to $R^{10}$ optionally bonded to each other to form a ring, $R^1$ to $R^{10}$ subjected to the formation of the ring optionally represent an atomic group required for the formation of the ring, and the formed ring optionally have a substituent.

4. The aqueous ink according to claim 3, wherein the organic pigment is a self-dispersible pigment to which at least one hydrophilic group selected from the group consisting of a carboxylic acid group, a sulfonic acid group, a phosphate group, alkali metal salts of the groups, and a hydroxy group is bonded.

* * * * *